(12) United States Patent
Bishel

(10) Patent No.: US 12,454,284 B2
(45) Date of Patent: *Oct. 28, 2025

(54) VEHICLE GUIDANCE SYSTEM

(71) Applicant: Vehicle Radar Guidance, LLC, Beaverton, OR (US)

(72) Inventor: Richard Anthony Bishel, Beaverton, OR (US)

(73) Assignee: Vehicle Radar Guidance, LLC, Beaverton, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 18/761,408

(22) Filed: Jul. 2, 2024

(65) Prior Publication Data

US 2024/0351611 A1    Oct. 24, 2024

Related U.S. Application Data

(63) Continuation of application No. 17/861,259, filed on Jul. 11, 2022, now Pat. No. 12,077,179, which is a (Continued)

(51) Int. Cl.
*B60W 60/00* (2020.01)

(52) U.S. Cl.
CPC ..... *B60W 60/001* (2020.02); *B60W 2420/408* (2024.01)

(58) Field of Classification Search
CPC ........... B60W 60/001; B60W 2420/52; B60W 10/20; G05D 1/0265
See application file for complete search history.

(56) References Cited

U.S. PATENT DOCUMENTS

| 2,908,002 A | 10/1959 | Van Atta |
| 2,996,137 A | 8/1961 | Chu et al. |

(Continued)

FOREIGN PATENT DOCUMENTS

| DE | 102016116515 A1 | 3/2018 |
| DE | 102019008595 B4 | 6/2021 |

(Continued)

OTHER PUBLICATIONS

McGrath, Michael E., Autonomous Vehicles: Opportunities, Strategies, and Disruptions (Michael E. McGrath 2018).

(Continued)

*Primary Examiner* — Thomas Ingram

(57) ABSTRACT

An apparatus determines a lateral position of a land vehicle on a pathway, on a surface of which one or more microwave reflectors are distributed in a direction of travel of the vehicle. The microwave reflectors have reflectivity different from the surface of the pathway where no microwave reflectors are present. The apparatus comprises a radar sensor and a processor. The radar sensor is mounted to the vehicle and configured to transmit a radar signal having a beam pattern center aimed downward from the vehicle toward the surface of the pathway and sideways from the vehicle generally perpendicular to the direction of travel. The radar sensor is also configured to detect one or more reflections of the radar signal from the pathway. The processor is operatively connected to the radar sensor and configured to determine a lateral distance of the vehicle from at least one of the microwave reflectors.

20 Claims, 36 Drawing Sheets

Related U.S. Application Data continuation of application No. 16/602,094, filed as application No. PCT/US2018/019047 on Feb. 21, 2018, now Pat. No. 11,400,956.

(60) Provisional application No. 62/600,593, filed on Feb. 23, 2017.

(56) References Cited

U.S. PATENT DOCUMENTS

| | | | |
|---|---|---|---|
| 3,198,279 A * | 8/1965 | Quinn | G05D 1/0265 180/168 |
| 3,332,327 A | 7/1967 | Heenan | |
| 3,418,896 A | 12/1968 | Rideout | |
| 3,712,706 A | 1/1973 | Stamm | |
| 3,922,066 A | 11/1975 | Schaefer | |
| 4,096,479 A | 6/1978 | Van Buskirk | |
| 4,104,634 A | 8/1978 | Gillard et al. | |
| 4,147,447 A | 4/1979 | Heenan et al. | |
| 4,352,106 A | 9/1982 | Firth | |
| 4,551,726 A | 11/1985 | Berg | |
| 4,823,131 A | 4/1989 | Bell | |
| 5,097,265 A | 3/1992 | Aw | |
| 5,134,413 A | 7/1992 | Bruder | |
| 5,202,742 A * | 4/1993 | Frank | G05D 1/0236 356/5.1 |
| 5,208,603 A | 5/1993 | Yee | |
| 5,257,875 A | 11/1993 | Flanagan | |
| 5,277,513 A | 1/1994 | Flanagan et al. | |
| 5,340,231 A | 8/1994 | Steere et al. | |
| 5,347,456 A | 9/1994 | Zhang et al. | |
| 5,390,118 A | 2/1995 | Margolis et al. | |
| 5,402,129 A | 3/1995 | Gellner et al. | |
| 5,667,335 A | 9/1997 | Khieu et al. | |
| 5,684,490 A * | 11/1997 | Young | H01Q 15/0013 342/6 |
| 5,875,408 A | 2/1999 | Bendett et al. | |
| 6,005,511 A | 12/1999 | Young et al. | |
| 6,008,751 A | 12/1999 | Kudoh | |
| 6,081,187 A | 6/2000 | Akutsu | |
| 6,082,466 A | 7/2000 | Gudat | |
| 6,116,812 A | 9/2000 | Hedgewick | |
| 6,194,486 B1 | 2/2001 | Yujiri et al. | |
| 6,345,217 B1 | 2/2002 | Zeitler et al. | |
| 6,414,606 B1 * | 7/2002 | Yujiri | E01F 9/30 340/904 |
| 6,439,803 B1 | 8/2002 | Lowe | |
| 6,445,334 B1 | 9/2002 | Bradley et al. | |
| 6,456,231 B1 | 9/2002 | Mcewan | |
| 6,720,908 B1 | 4/2004 | Puglia | |
| 6,742,903 B2 | 6/2004 | Canning | |
| 6,882,300 B2 | 4/2005 | Nakamura et al. | |
| 7,205,924 B2 | 4/2007 | Vemulapalli et al. | |
| 7,969,558 B2 | 6/2011 | Hall | |
| 8,099,205 B2 | 1/2012 | Coats et al. | |
| 8,425,144 B2 | 4/2013 | Bjorklund | |
| 8,466,776 B2 | 6/2013 | Fink et al. | |
| 8,494,615 B2 | 7/2013 | Melamed et al. | |
| 8,630,795 B2 | 1/2014 | Breed et al. | |
| 8,704,704 B2 | 4/2014 | Luebbert et al. | |
| 8,761,987 B2 | 6/2014 | Olinger et al. | |
| 8,949,024 B2 | 2/2015 | Stanley et al. | |
| 9,231,310 B2 | 1/2016 | Purden et al. | |
| 9,261,590 B1 * | 2/2016 | Brown | G01S 13/93 |
| 9,274,222 B1 | 3/2016 | Schmalenberg et al. | |
| 9,519,088 B2 | 12/2016 | Juni et al. | |
| 9,530,062 B2 | 12/2016 | Nguyen et al. | |
| 9,701,846 B2 | 7/2017 | Protzmann et al. | |
| 9,753,120 B2 | 9/2017 | Ramasubramanian et al. | |
| 10,094,920 B2 | 10/2018 | Rao et al. | |
| 10,145,993 B1 | 12/2018 | Hadi et al. | |
| 10,168,419 B2 | 1/2019 | Trummer | |
| 10,222,463 B2 | 3/2019 | Hong et al. | |
| 10,330,773 B2 | 6/2019 | Rao et al. | |
| 10,359,512 B1 | 7/2019 | Hong et al. | |
| 10,502,826 B2 | 12/2019 | Tasovac et al. | |
| 10,613,208 B2 | 4/2020 | Ali et al. | |
| 10,641,866 B2 | 5/2020 | Ramasubramanian et al. | |
| 10,656,264 B2 | 5/2020 | Lee | |
| 10,663,581 B2 | 5/2020 | Decker et al. | |
| 10,718,852 B2 | 7/2020 | Giannini et al. | |
| 10,732,636 B2 | 8/2020 | Mocherla et al. | |
| 10,782,389 B2 | 9/2020 | Rao et al. | |
| 10,824,152 B2 | 11/2020 | Badolato Martin | |
| 10,867,139 B2 | 12/2020 | Kovarik et al. | |
| 11,047,970 B2 | 6/2021 | Bharadwaj et al. | |
| 11,092,686 B2 | 8/2021 | Rajendran et al. | |
| 11,112,498 B2 | 9/2021 | Miu | |
| 11,119,186 B2 | 9/2021 | Roh | |
| 11,125,856 B2 | 9/2021 | Ikram et al. | |
| 11,163,054 B2 | 11/2021 | Weinmann et al. | |
| 11,195,028 B2 | 12/2021 | Lee et al. | |
| 11,199,413 B2 | 12/2021 | Weissman et al. | |
| 11,209,522 B2 | 12/2021 | Rao et al. | |
| 11,237,011 B2 | 2/2022 | Yeung | |
| 11,243,304 B2 | 2/2022 | Hong et al. | |
| 11,340,342 B2 | 5/2022 | Xin et al. | |
| 11,366,211 B2 | 6/2022 | Rao et al. | |
| 11,385,345 B2 | 7/2022 | Lee | |
| 11,400,956 B2 | 8/2022 | Bishel | |
| 11,520,004 B2 | 12/2022 | Bharadwaj et al. | |
| 11,609,303 B2 | 3/2023 | Stettiner et al. | |
| 11,650,304 B2 | 5/2023 | Wang et al. | |
| 2003/0123930 A1 | 7/2003 | Jacobs et al. | |
| 2003/0214429 A1 | 11/2003 | Nakamura et al. | |
| 2004/0101364 A1 | 5/2004 | Kuo | |
| 2005/0156809 A1 | 7/2005 | Nakamura et al. | |
| 2005/0187701 A1 | 8/2005 | Baney | |
| 2006/0114146 A1 | 6/2006 | Lindenmeier et al. | |
| 2007/0109175 A1 | 5/2007 | Fukuda | |
| 2008/0228400 A1 | 9/2008 | Wheeler | |
| 2009/0015463 A1 | 1/2009 | Tschernitz et al. | |
| 2009/0041541 A1 | 2/2009 | Lowe | |
| 2012/0001735 A1 | 1/2012 | Fink et al. | |
| 2012/0050876 A1 | 3/2012 | Sugiyama et al. | |
| 2012/0271540 A1 | 10/2012 | Miksa et al. | |
| 2013/0165770 A1 | 6/2013 | Li et al. | |
| 2014/0222246 A1 * | 8/2014 | Mohamadi | G01S 13/0209 701/2 |
| 2015/0145711 A1 | 5/2015 | Maddox et al. | |
| 2015/0303581 A1 | 10/2015 | Bodo | |
| 2015/0355393 A1 | 12/2015 | Lu et al. | |
| 2016/0061942 A1 | 3/2016 | Rao et al. | |
| 2016/0132705 A1 * | 5/2016 | Kovarik | G01S 13/74 340/10.3 |
| 2016/0231746 A1 | 8/2016 | Hazelton et al. | |
| 2017/0022676 A1 | 1/2017 | Milano et al. | |
| 2018/0052464 A1 | 2/2018 | Badolato Martin | |
| 2018/0088229 A1 | 3/2018 | Rajendran et al. | |
| 2018/0159647 A1 | 6/2018 | Nayyar et al. | |
| 2018/0244195 A1 | 8/2018 | Haight | |
| 2019/0017235 A1 | 1/2019 | Snead | |
| 2019/0088148 A1 | 3/2019 | Jacobus et al. | |
| 2019/0234032 A1 | 8/2019 | Lowe | |
| 2019/0243378 A1 | 8/2019 | Satyavolu | |
| 2019/0250269 A1 | 8/2019 | Miu | |
| 2019/0316951 A1 | 10/2019 | McCormick | |
| 2020/0174098 A1 | 6/2020 | Lang et al. | |
| 2020/0238986 A1 | 7/2020 | Oh | |
| 2020/0258392 A1 | 8/2020 | Weissman et al. | |
| 2020/0292735 A1 | 9/2020 | Hadi et al. | |
| 2020/0355821 A1 | 11/2020 | Stanley et al. | |
| 2021/0103280 A1 | 4/2021 | Lacaze et al. | |
| 2021/0139045 A1 | 5/2021 | Bishel et al. | |
| 2021/0278498 A1 | 9/2021 | Nayyar et al. | |
| 2021/0373127 A1 | 12/2021 | Slobodyanyuk et al. | |
| 2022/0075058 A1 | 3/2022 | Cohen et al. | |
| 2022/0082681 A1 | 3/2022 | Rao | |
| 2022/0085492 A1 | 3/2022 | Bodo | |
| 2022/0099819 A1 | 3/2022 | Rajendran et al. | |
| 2022/0136186 A1 | 5/2022 | Lierse et al. | |
| 2022/0146660 A1 | 5/2022 | Singh | |
| 2022/0187424 A1 | 6/2022 | Abatzoglou et al. | |
| 2022/0206109 A1 | 6/2022 | Ikram et al. | |

(56) References Cited

U.S. PATENT DOCUMENTS

| | | |
|---|---|---|
| 2022/0214425 A1 | 7/2022 | Yoffe et al. |
| 2022/0320745 A1 | 10/2022 | Salehi et al. |
| 2022/0340164 A1 | 10/2022 | Bishel |
| 2023/0087392 A1 | 3/2023 | Bergen |
| 2023/0089124 A1 | 3/2023 | Bergen |
| 2023/0093282 A1 | 3/2023 | Bergen |
| 2023/0098184 A1 | 3/2023 | Bergen |
| 2023/0147256 A1 | 5/2023 | Koch |
| 2023/0176168 A1 | 6/2023 | Bergen |
| 2023/0184912 A1 | 6/2023 | Kadambi et al. |

FOREIGN PATENT DOCUMENTS

| | | |
|---|---|---|
| EP | 0000447 A1 | 1/1979 |
| EP | 0826090 A1 | 3/1998 |
| EP | 0826090 B1 | 3/1998 |
| EP | 2216659 A1 | 8/2010 |
| EP | 3276748 A1 | 1/2018 |
| EP | 3276748 B1 | 1/2018 |
| EP | 3008246 B1 | 5/2018 |
| FR | 2717131 A1 | 4/1996 |
| GB | 2246654 A | 2/1992 |
| GB | 2369248 A | 5/2002 |
| WO | 2016033361 A1 | 3/2016 |
| WO | 2018156652 A1 | 8/2018 |
| WO | 2019145909 A2 | 8/2019 |
| WO | 2019145911 A2 | 8/2019 |
| WO | 2019148000 A1 | 8/2019 |
| WO | 2019185676 A1 | 10/2019 |
| WO | 2022133082 A1 | 6/2022 |

OTHER PUBLICATIONS

Mengke Liu, et al., Lateral Control of a Convoy of Autonomous and Connected Vehicles With Limited Preview Information.

Michael Glen Anderson, Design of Multiple Frequency Continous Wave Radar Hardware and Micro-Doppler Based Detection and Classification Algorithims (University of Texas at Austin 2008).

Michael J. Olsen, et al., LIDAR for Maintenance of Pavement Reflective Markings and Retroreflective Signs: vol. 1: Reflective Pavement Markings (OR Dept. of Transportation 2018).

Michael Meyer, et al., Automotive Radar Dataset for Deep Learning Based 3D Object Detection, pp. 129-132 (Proceedings of the 16th Euro. Radar Conference 2019).

Michel Gay, et al., Penetration Depth of Synthetic Aperture Radar Signals in Ice and Snow: An Analytical Approach (Workshop Remote Sensing and Modeling of Surface Properties 2016).

MMwave Automotive Radar and Antenna System Development Using AWR Software (cadence).

MMwave Demo Visualizer (Texas Instruments 2020).

MMwave SDK User Guide (Texas Instruments 2017).

MMwave SDK User Guide (Texas Instruments 2019).

MMwave SDK User Guide (Texas Instruments 2022).

Mohamed Lamane, et al., Classification of Targets Detected by MMwave Radar Using YOLOV5 (Elsevier B.V. 2022).

Monolithic and Wafer Level Packaged Three-Axis Accelerometer (MemSic 2015).

Muhammad Asad Bashire, et al., Kalman Filter Based Sensor Fusion for Altitude Estimation of Aerial Vehicle (IOP Publishing 2020).

Naresh K. Darimireddy, et al., Perspectives of Convertors and Communication Aspects in Automated Vehicles, Part 2: Printed Antennas and Sensors for Automotive Radars (Energies 2021).

Neal Hawkins, Rumble Stripe: Evaluation of Retroreflectivity and Installation Practices (Minnesota Dept. of Transportation 2016).

Nguyen et al., "Stepped-Frequency Radar Sensors: Theory, Analysis and Design", First Edition, 2016, Springer.

Nikolaos Malachias, et al., Design and Experimental Evaluation of a Novel Type Radar Reflector for Use in the Marine Environment (ICMET OMAN 2019).

Niksa Orlic, et al., Micron-Precision Distance Measurement Using MMwave Radars (S&T Organization).

Nitin Sakhuja, MMwave-SDK Deep Dive Easy Evaluation and Development of MMwave Systems With Software Development Kit (Texas Instruments 2020).

Nolan, John, et al., Ros: Passive Smart Surface for Roadside-To-Vehicle Communication, pp. 165-178 (Sigcomm 2021).

Noon, David Andrew, Stepped-Frequency Radar Design and Signal Processing Enhances Ground Penetrating Radar Performance, pp. 1-180 (Univ. of Queensland 1996).

Nurdan Sonmez, et al., Double Lens Antennas in Millimeter-Wave Automotive Radar Sensors, pp. 901-907 (ACES Journal 2017).

O. Kuba, Lateral Acceleration of Passenger Vehicle in Roundabouts in Term of Cargo Securing (Automotive Safety 2022).

O-79 Imaging Radar: Ket Technical Specifications (Ainstien).

Osama Furqan Khan, Multilayer Antenna Design for Automotive Radar at 77 GHz (Universitat Ulm 2020).

Oskar Leander, et al., High Resolution Imaging With SAR Using Automotive Millimeter Wave Radars (Chalmers Univ. of Tech. 2021).

Paola Pierleoni, et al., A Wearable Fall Detector for Elderly People Based on AHRS and Barometric Sensor (IEEE Sensors Journal 2016).

Patrick Fiske, Software Defined Radio Based Frequency Modulated Continious Wave Ground Penetrating Radar (Univ. of Vermont 2020).

Pavel Rajmic, et al., Computational Cost of Chirp Z-Transform and Generalized Goertzel Algorithim (Brno Univ. of Tech. 2014).

PCT Ch. 2 Demand & Art. 34 Amendments & Remarks, Int'l Appl. No. PCT/US23/28710 (Feb. 23, 2024).

PCT Int'l Search Report, Int'l Appl. No. PCT/US18/19047 (May 10, 2018).

PCT Int'l Search Report, Int'l Appl. No. PCT/US23/28710 (Jan. 10, 2024).

Peng, "Modern Radar for Automotive Applications (Radar, Sonar and Navigation)", 2022, Scitech PublishingPeng, Zhengyu et al., Modern Radar for Automotive Applications, pp. v-viii (SciTech Publ. 2022).

Philip Koopman, et al., Challenges in Autonomous Vehicle Testing and Validation (SAE World Congress 2016).

Pierre Pettersson, Estimation of Vehicle Lateral Velocity (Lund University 2008).

Power Optimization for IWR1443 77-GHz Level Transmitter Reference Design (Texas Instruments 2018).

Prafull Ranjan, et al., Design of Circularly Polarized Rectangular Patch Antenna With Single Cut (CAC2S 2013).

Preparing for Automated Vehicles and Shared Mobility: State-of-the-Research Tropical Paper #3 (Transportation Research Board 2020).

Pushkar Hingwe, et al., Lateral Control of Heavy Vehicles for Automated Systems (UC Berkley 2003).

Pushkar Hingwe, et al., Lateral Control of Heavy Vehicles for Automated Systems: Final Report for MOU 313 (California PATH Research Report 2003).

R. H. Byrne, et al., Design of a Model Reference Adaptive Controller for Vehicle Road Following, pp. 343-354 (Elsevier Sci. Ltd. 1995).

R. Rajamani, Vehicle Dynamics and Control, pp. 15-46 (Springer 2012).

R. Rajamani, Vehicle Dynamics and Control, pp. 16-49 (Springer 2006).

Radar Congestion Study (NHTSA 2018).

Radar Cross Section (RCS).

Radar Hardware Accelerator (Texas Instruments 2018).

RFbeam XC-Scope User Manual (RFbeam Microwave GmbH).

Richard A. Bishel , "Dual-Mode Truck : Automated and Manual Operation", SAE 931837 , 1993 SAE Future Transportation Technology Conference , Aug. 1993.

Richard A. Bishel, Short-Range Radar for Use in Vehicle Lateral Guidance and Control (IEEE).

Chris Handel et al., "Detecting Passive Radar Reflectors for Automotive Applications"; Lapland Univ. of Applied Sci. (2019).

(56) References Cited

OTHER PUBLICATIONS

Chris Handel, et al., State-of-the-Art Review on Automotive Radars and Passive Radar Reflectors (Lapland UAS Publications 2018).
Christian Buchberger, et al., Dielectric Corner Reflectors for MMwave Applications, pp. 197-203 (Advances in Radio Science 2019).
Christian Waldschmidt, et al., Automotive Radar—From First Efforts to Future Systems (IEEE Journal of Microwaves 2021).
Collimator Lens (Silicon radar 2021).
Constantine A. Balanis, et al., Scattering Patterns of Dihedral Corner Reflectors With Impedance Surface impedances (Dept. of Elec. and Comp. Engineering 1988).
CZT Vs FFT: Flexibility Vs Speed.
D.A. DiGiovanni, et al., Backscattering of Ground Terrain and Buidling Materials at Millimeter—Wave and Terahertz Frequencies (Univ. of Massachusetts Lowell 2013).
Dae-Hyun Kim, "Lane Detection Method with Impulse Radio Ultra-Wideband Radar and Metal Lane Reflectors", ICT Based Public Transp. Research Team, Korea Railroad Res.Inst. (Jan. 6, 2020).
Damodar V. Kadaba, et al., Real-Time Through-Wall Imaging Using SFCW Radar System (9th Int'l Radar Symposium India 2013).
Dan Wang, et al., System Performance Measurement With the MMwave Sensor (Texas Instruments 2017).
Daniel Brodeski, et al., Deep Radar Detector.
Daniel Clarke, et al., Synthetic Aperture Radar for Lane Boundry Detection in Driver Assistace Systems.
Daniel Clarke, et al., Synthetic Aperture Radar for Lane Boundry Detection in Driver Assitance Systems.
Danijel Sipos, et al., SFCW Radar With an Integrated Static Target Echo Cancellation System (Sensors 2021).
Developer's Guide: MMwave Studio CLI Tool (Texas Instruments).
Dmitrii Solomitckii, et al., Radar Scheme With Raised Reflector for NLOS Vehicle Detection, pp. 9037-9045 (IEEE Transactions of Intelligent Transportation Systems 2022).
Donald E. Barrick, FM/CW Radar Signals and Digital Processing (NOAA Environmental Research Laboratories 1973).
Dong Kyoo Kim, et al., Quadrature Frequency-Group Radar and Its Center Estimation Algorithims for Small Vibrational Displacement (Nature—Scientific Reports 2018).
Dongyang Ao, et al., Accurate Analysis of Target Characteristics in Bistatic SAT Images: A Dihedral Corner Reflectors Case, pp. 1-26 (Sensors 2018).
Dudley Bird, Design and Manufacture of a Low-Profile Radar Retro-Reflector.
Ed Stellfox, Evaluation of Snowplowable, Retroreflective Raised Pavement Markers (Maryland State Highway Administration 2004).
Elahe Soltanaghaei, et al., Millimetro: MMwave Retro-Reflective Tags for Accurate, Long Range Localization, pp. 69-82 (ACM MobiCom '21 2021).
Electronic Warefare and Radar Systems Engineering Handbook (Naval Air Warfare Center Weapons Division 2013).
Electronic Warfare and Radar Systems Engineering Handbook (Naval Air Systems Command 1999).
Eleftherios I. Keroglu, Analysis and Design of Retroreflectors (Naval Postgraduate School 1997).
F.S. Holt, Comparison of Reflective Properties of Corner Reflector Clusters and Luneburg Lens Reflectors (Office of Aerospace Research 1966).
Fabian Michler, et al., Micrometer Sensing With Microwaves: Precise Radar Systems for Innovative Measurements Applications (IEEE Journal of Microwaves 2020).
Faruk Uysal, et al., Phase-Coded FMCW Automotive Radar: Application and Challenges (IEEE 2020).
Fatemeh Norouzian, et al., Experimental Study on Low-THZ Automotive Radar Signal Attenuation During Snowfall, pp. 1421-1427 (IET Radar, Sonar & Navigation 2019).
Federico Alimenti, et al., A 24-GHz Front-End Integrated on a Multilater Cellulose-Based Substrate for Doppler Radar Sensors (Sensors 2017).

Fei Liu, et al., An Adaptive UMB/MEMS-IMU Complementary Kalman Filter for Indoor Location in NLOS Environment (Remote Sensing 2019).
Feng et al., "Lane Detection With a High-Resolution Automotive Radar by Introducing a New Type of Road Marking", IEEE Transactions on Intelligent Transportation Systems—vol. 20, Issue 7 (Jul. 2019).
Feng Xu, et al., Transmit Beamspace DDMA Based Automotive MIMO Radar.
Fenton, R. E. et al., "Fundamental Studies in Automatic Vehicle Control", Report No. FHWA / RD-80 / 198, Transportation Control Laboratory, The Ohio State University, pp . 52-128.
Filip Turcinovic, et al., Polarization Sensitivity of Short-Range S-Band Radar Sensing System (63rd Int'l Symposium ELMAR 2021).
Florian Folster, et al., Signal Processing Structure for Automotive Radar (2005).
Glenn Robb, Circularly Polarized Antennas Explained, Without the Math (Antenna Test Lab).
Gonzalez, Rodrigo P., Deep Learning Methods for Automotive Radar Signal Processing, pp. vii-viii (Cuvillier Verlag 2021).
Gor Hakobyan, et al., High-Performance Automotive Radar (IEEE Signal Processing Magazine 2019).
Grantham Pang, et al., Evaluation of a Low-Cost MEMS Accelerometer for Distance Measurement, pp. 249-265 (Journal of Intelligent and Robotic Systems 2001).
Greisman et al., "Detection of Conductive Lane Markers Using MMwave FMCW Automotive Radar" (Sep. 23, 2021).
Haibo Song, Computing Second-Order Scattering of Obtuse Dihedral for Any Incident Angle, pp. 6272-6277 (IET Journals 2019).
Hamed Zamenian, et al., Installation and Maintenance of Raised Pavement Markers at State Transportation Agengies: Synthesis of Current Practices (Indiana Dept. of Transportation and Purdue Univ. 2020.
Hanna Karlsson, Design of Gap Waveguide Antenna System for 77 GHz Automotive Radar (Chalmers Univ. of Tech. 2018).
Han-Shue Tan, et al., Lane Changing With Look-Down Reference Systems on Automated Highways, pp. 1033-1043 (Control Engineering Practice 8 2000).
Han-Shue Tan, et al., Vehicle Lateral Warning, Guidance and Control Based on Magnetic Markers: Path Report of Ahsra Smart Cruise 21 Proving Tests (University of California Berkeley 2001).
Hao Zhou, et al., A Retrodirective Antenna Array With Polarization Rotation Property, pp. 4081-4088 (IEEE Transactions of Antennas and Propagation 2014).
Harry D. Mafukidze, et al., Scattering Centers to Point Clouds: A Review of MMwave Radars for Non-Radar-Engineers, pp. 110992-111021 (IEEE Access 2022).
Helene Oriot, Moving Target Detection on SAR Images (S&T Organization 2014).
Richards, Mark A. et al., Principles of Modern Radar: Basic Principles, pp. vii-xvi (SciTech Publ. 2010).
Rolf Ole R. Jenssen, et al., Drone-Mounted UWB Snow Radar: Technical Improvements and Field Results, pp. 1930-1954 (Journal of Electromagnetic Waves and Applications 2020).
Rongguo Zhou et al., A Wideband Circularly Polarized Patch Antenna for 60 GHz Wireless Communications, Scientific Research (Jun. 2012).
Roza Maghsood, et al., Detection of the Curves Based on Lateral Acceleration Using Hidden Markov Models, pp. 425-434 (Elsevier 2013).
Sabikun Nahar, Design and Implementation of a Stepped Frequency Continious Wave Radar System for Biomedial Applications (Univ. of Tennessee, Knoxville 2018).
Salvador Dominguez, et al., Comparison of Lateral Controllers for Autonomous Vehicle, pp. 1418-1423 (ITSC 2016).
Salvador Dominguez-Quijada, et al., Comparison of Lateral Controllers for Autonomous Vehicle: Experimental Results (Int'l IEEE Conf. on Intelligent Transportation Systems 2016).
Santra, Avik et al., Deep Learning Applications of Short-Range Radars, pp. v-xi (Artech 2020).
Saponara et al., "Highly Integrated Low-Power Radars", 2014, Artech House Publishers.

(56) References Cited

OTHER PUBLICATIONS

Scott Himes, et al., Decision Support Guide for the Installation of Shoulder and Center Line Rumble Strips on Non-Freeways (Federal Highway Administration Office of Safety 2016).
Section 706: Raised Retro-Reflective Pavement Markers and Bituminous Adhesive.
Section 919—Raised Pavement Markers (Georgia DOT).
Seibum B. Choi, The Design of a Look-Down Feedback Adaptive Controller for the Lateral Control of Front-Wheel-Steering Autonomous Highway Vehicles, pp. 2257-2269 (IEEE Transactions on Vehicular Technology 2000).
Serdal Ayhan, et al., FMCW Radar System With Additional Phase Evaluation of High Accuracy Range Detection (KIT).
Shahrzad Minooee Sabery, et al., Study of Low Terahertz Radar Signal Backscattering for Surface Identification (Sensors 2021).
Sharma et al., "Development and Evaluation of Chip-Enabled Raised Pavement Markers for Lane Line Detection" (2008).
Shashi Halai, Active Target Location Using Crossed-Dipole Based Circular Array FMCW Radar (University College London 2014).
Sheng Wei, et al., Altitude Data Fusion Utilising Differential Measurement and Complementary Filter (IET Journals 2016).
Shortform Description K-XC-1 (RFbeam Microwave GmbH 2011).
Shoulder and Edge Line Rumble Strips (Federal Highway Administration 2011).
Shrikant Sharma, et al., Ambiguity Function Analysis of SFCW and Comparison of Impulse GPR and SFCW GPR (9h Int'l Radar Symposium India 2013).
Shuen-Yih Wang, et al., A Compact RCS Formula for a Dihedral Corner Reflector at Arbitrary Aspect Angles (IEEE Trans. on Antennas and Propagation 1998).
Shweta Sharma, et al., Radiometric Calibration Stability Assessment for Teh RISAT-1 SAR Sensor Using a Deployed Point Target Array at the Desalpar Sit, Rann of Kutch, India (Int'l Journal of Remote Sensing 2017).
Shyh-Jong Chung, et al., A Retrodirective Microstrip Antenna Array, pp. 1802-1809 (IEEE Transactions on Antennas and Propagation 1998).
Sining An, et al., Micrometer Accuracy Phase Modulated Radar for Distance Measurement and Monitoring.
Skolnik, Merrill I., Introduction to Radar Systems, pp. vii-ix (McGraw-Hill 1962).
Sneha Narnakaje, TI's Smart Sensors Ideal for Automated Driving Applications (Texas Instruments 2017).
Stephen Alland, et al., Interference in Automotive Radar Systems, pp. 45-59 (IEEE Signal Processing Magazine).
Steve Luke, Performance Investigation of Marine Radar Reflectors on the Market (QinetiQ Ltd. 2007).
Stffen Heuel, Radar Waveforms for A&D and Automotive Radar: White Paper (Rhode & Schwarz).
Systems Characteristics of Automotive Radars Operating in the Frequency Band 76-81 GHz for Intelligent Transport Systems Applications (Int'l Telecommunications Union—Radiocommunication Sector 2018).
Tanner J. Douglas, Common-Aperture Dual-Polarized Transceiver Antenna Systems for Millimeter-Wave Polarimetric Radar (Univ. of Michigan 2022).
Tarig Ibrahim Osman, et al., Analysis of Radar Cross Sectional Area of Corner Reflectors (IOSR Journal of Engineering 2014).
Tarig Ibrahim Osman, et al., Analysis of Radar Cross Sectional Area of Corner Reflectors, pp. 47-51 (IOSR Journal of Engineering 2014).
Tariqul Islam, et al., Comparison of Complementary and Kalman Filter Based Data Fusion for Attitude Heading Reference System (AIP Publishing 2023).
Taylor, James D., Ultra-Wideband Radar Technology (CRC Press 2001).
Taylor, James D., Ultra-Wideband Radar; Applications and Design pp. v-vi (CRC Press 2012).
Theresa C. Gilman, Field Evaluation of Snowplowable Raised Pavement Markers on the Vermont Interstate Highway System (State of Vermont Agency of Trasnportation Materials and Reasearch 2002).
Thomas Edling, Design of Circular Polarized Dueal Band Patch Antenna (Uppsala Universitet 2012).
TI Designs: TIDEP-0092—Short Range Radar Reference Design Using AWR 1642 (Texas Instruments 2017).
TI MMwave Labs: High Accuracy Range Measurement—16XX (Texas Instruments 2017).
Till Menzel, et. al., Scenarios for Development, Test, and Validation of Automated Vehicles (IEEE 2018).
Tim Claycomb, Single-Supply Strain Gauge in Bridge Configuration Reference Design (Texas Instruments 2015).
Timo Kempf, et al., Microwave Radar Signature Acquisition of Urban Structures, pp. 68-73 (Proceedings of WFMN07 2007).
Todd Litman, Autonomous Vehicle Implementation Predictions (Victoria Transport Policy Institute 2023).
Toshiki Yamawaki, et al., 60-GHz Millimeter-Wave Automotive Radar (Fujitsu Ten Tech. Journal 1998).
Trihedral Corner Reflector.
Tristan Visentin, et al., Analysis of Multipath and DOA Detection Using a Fully Polarimetric Automotive Radar, pp. 570-577 (International Journal of Microwave and Wireless Technologies 2018).
Tristan Visentin, et al., Classification of Objects in Polarimetric Radar Images Using CNNS at 77 GHz (2017).
Tristan Visentin, Polarimetric Radar for Automotive Applications (KIT Sci. Publ.).
URAD IWR-AWR Adapter: Adapter for Connecting URAD IWR or AWR to Raspberry PI (uRAD).
URAD Level Sensing: High-Performance Solution for Frontal Distance Sensing (uRAD).
URAD Product Catalogue (uRAD 2023).
URAD User Manual: Automotive Version (uRAD 2023).
Vera Kurz, et al., Road Surface Characteristics for the Automotive 77 GHz Band, pp. 166-172 (Advances in Radio Science 2021).
Ville Viikari, et al., Automotive Radar Technology for Detecting Road Conditions. Backscattering Properties of Dry, Wet, and Icy Asphalt, pp. 276-279 (EuRAD 2008).
Vivek Dham, Programing Chirp Parameters in TI Radar Devices (Texas Instruments 2020).
V-LD1 Digital Distance Sensor (RFbeam Microwave GmbH 2023).
Voronov et al., "Radar Reflecting Pavement Markers for Vehicle Automation".
Watzenig, Daniel et al., Automated Driving: Safer and More Efficient Future Driving, pp. ix-xii (Springer 2017).
Wayne Stark, et al., Digital Code Modulation (DCM) Radar for Automotive Application (Uhnder White Paper 2020).
WCR External Calibration Using Trihedral Coner Reflector.
Wei-bin Zhang, et al., An Intelligent Roadway Reference System for Vehicle Lateral Guidance/Control (University of California Berkeley 1990).
Wei-meng Niu, et al., Small Displacement Measuring System Based on MEMS Accelerometer (Hindawi Mathematical Problems in Engineering 2019).
Welcome!: Texas Instruments New Product Update (Texas Instruments 2020).
Wen-Jiao Liao, et al., Radar Cross Section Enhancing Structures for Automotive Radars (IEEE Antennas and Wireless Propagation Letters 2018).
Wonshik Chee, et al., Unified Lateral Motion Control of Vehicles for Lane Change Maneuvers in Automated Highway Systems (Univ. of California Berkeley 1997).
Xiangyu Gao, et al., Experiments With MMwave Automotive Radar Test-Bed (2022).
Xiaojian Fu, et al., Terahertz Beam Steering Technologies: From Phased Arrays to Field-Programmable Metasurfaces, pp. 1-22 (Advanced Optical Materials 2019).
Xue-Bo Jin, et al., Multi-Sensor Information Fusion (Sensors 2020).
Y.C. Guo, et al., Retrodirective Array Technology, pp. 153-167 (Progress in Electromagnetics Research B 2008).
Yang Qian, Movement Pattern Detection Through IMU and Barometer (Oregon State Univ. 2019).

(56) References Cited

OTHER PUBLICATIONS

Yeun-Sub Byun, Vehicle Position Estimation Based on Magnetic Markers: Enhanced Accuracy by Compensation of Time Delays (Sensors 2015).
Yonglei Shi, et al., Research on Distance Measurement Method Based on Micro-Accelerometer (AIP Publ. 2021).
Yong-Qiang Liu, et al., Planar Microwave Retroreflector Based on Trasmissive Gradient Index Metasurface (New Journal of Physics 2020).
Yoshana Deep, Polarimetric Radar Cross-Sections of Pedastrians at Automotive Radar Frequencies (Indraprastha Institute of Information technology 2019).
Young-Jin Park, et al., Development of a Web GPR Ststem for Detecting Small Objects Buried Under Ground (Power Telecommunication Network Research Group).
Yue Yu, et al., Study of MM-Wave Scattering of Roadside Targets for Vehicular Road Departure Detection Applications (IOP Conf. Ser.: Earth Environ).
Yunlong Zhang, et al., 0-5059; Raised Pavement Marker Improvements (Texas Transportation Institute, Texas A&M Univ. System 2007).
Yunlong Zhang, et al., Development of Measures to Improve Field Performance of Retroreflective Raised Pavement Markers (Texas Dept. of Transportation 2009).
Yuxiao Zhang, et al., Perception and Sensing for Autonomous Vehicles Under Adverse Weather Conditions: A Survey, pp. 146-177 (ISPRS Journal of Photogrammetry and Remote Sensing 2023).
Zhengxiong Li, et al., Ferrotag: A Paper-Based MMwave-Scannable Tagging Infrastructure, pp. 324-337 (SenSys '19 2019).
Ho-Ik Choi, et al., Selecting Target Range With Accurate Vital Sign Using Spatial Phase Coherency of FMCW Radar (Applied Sciences 2021).
Huei Peng, et al., Lateral Control of Front-Wheel-Steering Rubber-Tire Vehicles (University of California Berkeley 1990).
HyunGi Yoo, et al., Implementation of an LFM-FSK Transceiver for Automotive Radar, pp. 258-264 (IEEE Transactions of Smart Processing and Computing 2015).
Ikka Kotilainen, et al., Connected and Automated Driving in Snowy and Icy Conditions—Results of Four Field-Testing Activities Carried out in Finland (SAE Int'l Journal of Connected and Automated Vehicles 2021).
Impacts of Automatived Vehicles on Highway Infrastructure (US Dept. of Transportation Federal Highway Administration 2021).
Index 17352: Typical Placement of Reflective Pavement Markers (FDOT—Standard Plans 2017).
Issues in Autonomous Vehicle Testing and Deployment (Congressional Research Service 2021).
IWF6843AOPEVM (Texas Instruments).
IWR1443BOOST Evaluation Module MMwave Sensing Solution (Texas Instruments 2020).
IWR14XX/16XX/18XX/64XX Industrial Radar Family: Technical Reference Manual (Texas Instruments 2020).
IWR1X Industrial MMwave Sensors: Portfolio Overview (Texas Instruments 2018).
J.A. de Geus, Practically Strong Stable Lateral Control Solution for a Homogeneous Platoon of Vehicles (Delft Univ. of Tech. 2021).
Jain et al., "Automotive Radar Sensors in Silicon Technologies", 2012 edition, Springer.
Jaswinder Lota, et al, Low Computational Sensing With Goertzel Filtering for Mobile Industrial IOT Devices.
Jesse R. Ludwig, Design and Analysis of Circularly Polarized Electrically Small Antennas (Georgia Southern University 2014).
Jin Xu, An Experimental Study on Lateral Acceleration of Cars in Different Environments in Sichuan, Southwest China (Hindawi Publ. Corp. 2014).
Jingjing Jiang, et al., Lateral Control of an Autonomous Vehicle (IEEE 2018).
Jinwook Kim, et al., Modulation Type Classification of Interference Signals in Automotive Radar Systems (IET Journals 2018).
Jonas Rahm, et al., Radar Hot Spots From Dihedral Corner Reflectors (FOI—Swedish Defence Research Agency 2006).
Jorge Vargas, et al., An Overview of Autonomous Vehicles Sensors and Thier Vulnerability of Weather Conditions (Sensors 2021).
Jose Borras Sillero, Sensor Fusion Methods for Indoor Naviagation Using UW Radio Aided INS/DR (KTH Elec. Engineering 2012).
Juan Carlos Alvarez, et al., Accelerometry-Based Distance Estimation for Ambulatory Human Motion Analysis (Sensors 2018).
Jukka Heikkonen, et al., Application of Multi-Sensor Fusion Technology in Target Detection and Recognition (MDPI 2022).
Jun Lin, Radar Characteristics Study for the Development of Surrogate Roadside Objects (Purdue University 2018).
Jurgen Guldner, et al., On Fundamental Issues of Vehicle Steering Control for Highway Automation (Univ. of California Berkeley 1997).
Kaaren Hofmann, et al., Evaluation of Raised and Recessed Pavement Markers (OR Dept. of Transportation 1995).
Karthik Ramasubramanian, et al., AWR1443 Single Chip Radar: For Diverse Proximity—Sensing Applications (Texas Instruments 2017).
Kathleen Minear, et al., Widely-Spaced Large Reflector Arraying for Space Surveillance (AMOS 2022).
Katsuyuki Ohguchi, et al., 79GHz Band Ultra-Wideband Automotive Radar (Fujitsu Ten Tech. Journal 2013).
Krisztina Kelevitz, et al., Novel Corner-Reflector Array Application in Essential Infrastructure Monitoring (IEEE Transactions on Geoscience and Remote Sensing 2022).
Kshitiz Bansal, et al., R-Fiducial: Reliable and Scalable Radar Fiducials for Smart MMwave Sensing.
K-XC 1 Digital Distance Radar (RFbeam Microwave GmbH 2011).
Laszlo Banyai, et al., Investigation of Integrated Twin Corner Reflectors Designed for 3-D Insar Applications (IEEE Geoscience and Remote Sensing Letters 2020)(.
Leilei Deng, et al., Application of Two Spectrum Refinement Methods in Frequency Estimation (Journal of Physics: Conference Series 2022).
Level Sensing—Application Notes (uRAD).
Liu, Shaoshan et al., Creating Autonomous Vehicle Systems, pp. v-viii (Morgan & Claypool 2018).
Lukas Piotrowsky, et al., Enabling High Accuracy Distance Measurements With FMCW Radar Sensors, pp. 5360-5371 (IEEE 2019).
M. Mercuri, et al., SFCW Microwave Radar for In-Door Fall Detection.
M. Vadai, Fast Fourier and Z-Transforms With Almost Arbitrart Frequency Spacing (BLonD Meeting 2021).
Mahvish Nazir, Automotive Radar Target Detection Using Ambiguity Function (Univ. of Birmingham 2016).
Maochang Feng, et al., Wide-Angle Flat Metasurface Corner Reflector (Applied Physics Letters 2018).
Maria S. Greco, Automotive Radar (IEEE Radar Conference 2012).
Martin Schneider, Automotive Radar—Status and Trends, pp. 144-147 (GeMiC 2005).
Martti E. Tiuri, et al., The Complex Dielectric Constant of Snow at Microwave Frequencies, pp. 377-382 (IEEE Journal of Oceanic Engineering 1984).
Marwan A. Jabber, et al., The JM-Filter to Detect Specific Frequency in Monitored Signal.
Massimiliano Peiraccini, et al., A Doppler Range Compensation for Step-Requency Continuous-Wave Radar for Detecting Small UAV (Sensors 2019).
Matt Markel, Radar for Fully Autonomous Driving, pp. vii-xii (Artech House 2022).
Matthew Barrett, Investigation of Millimetre FMCW Radar for Improved Situational Awareness for Fire Fighting Vehicles (Univ. of Southern Queensland 2020).
Matthew C. Garthwaite, On the Design of Radar Corner Reflectors for Deformation Monitoring in Multi-Frequeny Insar (Remote Sensing 2017).
Mattia Caffa, et al., Binary-Phase Vs. Frequency Modulated Radar Measured Performances for Automotive Applications (Sensors 2023).
10 Pack Commercial Road Reflector—4×4 Yellow (LED Lighting Solutions).

(56) References Cited

OTHER PUBLICATIONS

4D Imaging Radar Addressing the Rising Complexity and Cost of Automotive Safety, Vayyar.
77 GHz Radar Sensor Operational Description Product Model: 77V125CRN (Veoneer).
A.J. Gatesman, et al., Physical Scale Modeling the Millimeter-Wave Backscattering Behavior of Ground Clutter (US Army Nat'l. Ground Intelligence Center 2001).
A.R. Chandran, et al., Radar Cross-Section Enhancement of Dihedral Corner Reflector Using Fractal-Based Metallo-Dielectric Structures (Electronics Letters vol. 42, No. 20 2006).
Abel Garcia-Devesa, et al., Comparison of Computing Efficiency Among FFT, CZT and Zoom FFY in THZ-TDS, pp. 1-10 (Nanophotonics Tech. Center 2021).
Abhilash Nagest Kashyap, et al., Identifiable Radar Reflectors for Automotive Pedestrian Safety (Halmstand University 2020).
Ahmed Bilal Numan, et al., Wide Field of View Retrodirective Millimeter Wave Antenna Array With Pulse Modulation and Orthoganal Polarization States, pp. 221127-221137 (IEEE Access 2020).
Akanksha Bhutani, et al., The Role of Millimeter-Waves in the Distance Measurement Accuracy of an FMCW Radar Sensor (Sensors 2019).
Alaca et al., "High-tech pavement markers support autonomous driving in tough conditions, remote areas" (Jun. 20, 2023).
Alec Gorjestani, et al., Evaluation of Radar for Snowplows: Initial Results (Minnesota Dept. of Transportation 1998).
Alejandro Badolato et al., "Radar Positioning System for surface transport", IRF Global R2T Conference (Date Unknown).
Ali Alhaj Abbas, et al., Corner Reflectors Tag With RCS Frequency Coding by Dielectric Resonators, pp. 560-570 (The Institution of Engineering and Tech. 2020).
Aloysius Adya Pramudita, et al., Small Displacement Detecting Method Based on Multifrequency Continious Wave Radar System (Journal of Physics: Conference Series 2019).
Alvaro F. Vawuero, et al., Low-Cost Dielectric Flat Lens for Near-Field Focusing.
Andarining Palupi, et al., Dual Frequency Continious Wave Radar for Small Displacement Detection (EECSI 2018).
Anders Wikstrom, Yaw Rate and Lateral Acceleration Sensor Plausibilisation in an Active Front Steering Vehicle (Linkopings Universitet 2006).
Anggera Bayuwindra, Look-Ahead Tracking Controllers for Integrated Longitudinal and Lateral Control of Vheicle Platoons (2019).
Anneli Blomqvist, Millimeter Wave Radar as Navigation Sensor on Robotic Vacuum Cleaner (KTH Royal Institute of Tech. 2020).
Anthony Jan Dratnal, A Liquid Crystal-Switched Passive Van Atta Array Element for Millimetre-Wave Automobile Radar Target Enhancement and Concurrent Data Modulation in Adverse Weather Conditions (University of Calgary 2017).
Antonio Sorrentino, et al., Measurements of Backscattering From a Dihedral Corner in a Reverberating Chamber, pp. 56-59 (Aces Express Journal 2016).
Armin W. Doerry, et al., Radar Cross Section of Triangular Trihedral Reflector With Extended Bottom Plate (Sandia Nat'l Laboratories 2009).
Armin W. Doerry, Reflectors for SAR Performance Testing (Sandia National Laboratories 2008).
Axel Trange, FMCW MMwave Radar for Detection of Pulse, Breathing, and Fall Within Home Care (KTH Royal Inst. of Tech 2021).
Basics of Measuring the Dielectric Properties of Materials: Application Note (Keysight Technologies 2017).
Baum, Carl E. et al., Ultra-Wideband Short-Pulse Electromagnetics 8, pp.vii-ix (Springer 2007).
Beam Reflector (Mouser Electronics).
Belal Al-Qudsi, et al., Zoom FFT for Precise Spectrum Calculation in FMCW Radar Using FPGA, pp. 337-340 (Prime 2013).
Bishel, Richard Anthony, The Design and Development of an Ultra-Short Range Radar for Use in a Lateral Control Ststem for Automated Ground Transportation, pp. 1-2 (Ohio State University Graduate School 1980).
BNO055 Intelligent 9-Axis Absolute Orientation Sensor (Bosch Sensortec 2016).
BNO08X Data Sheet (CEVA 2023).
Brian Ginsburg, et al., Fluid-Level Sensing Using 77-GHz Millimeter Wave (Texas Instruments 2017).
Bryan Siepert, Adafruit 9-DOF Orientation IMU Fusion Breakout—BN0085 (adafruit learning system 2020).
Buehler, Martin et al., The 2005 DARPA Grand Challenge: The Great Robot Race, pp. XIL-XLI (Springer 2007).
Cailing Wang, et al., Automotive FMCW Radar-Enhanced Range Estimation Via a Local Resampling Fourier Transform (Int'l Journal of Adv. Robotic Systems 2016).
Calculating Radius of Turn From Yaw Rate (Racelogic VBox).
Call for Papers (IEEE IAVVC 2023).
Camillo J. Taylor, et al., A Comparative Study of Vision-Based Lateral Control Strategies for Autonomous Highway Driving.
Carmine E. Dwyer, et al., Investigating the Optimum Performance of the Snowplowable Reflective Pavement Markers (Illinois Center for Transportation 2019).
Cesar Iovescu, et al., The Fundamentals of Millimeter Wave Radar Sensors (Texas Instruments 2020).
Chai K. Toh, et al., Wireless Digital Traffic Signs of the Future, pp. 74-78 (IET Journals 2018).
Chameswary Janardhanan, et al., Microwave Dielectric Properties of Flexible Butyl Rubber-Strontium Cerium Titanate Composites, pp. 3426-3433 (Journal of Applied Polymer Science 2012).
Chapter 13: Continious Wave Radar.
Charles A. Duboc, Corner Reflectors, pp. 1-22 (MIT Dept. of Physics 1943).
Charvat, Gregory L., Small and Short-Range Radar Systems, pp. vii-xiii (CRC Press 2014).
Chengkun Liu, et al., Experimental Evaluation of Sensor Fusion of Low-Cost UWB and IMU for Localization Under Indoor Dynamic Testing Conditions (Sensors 2022).
Chethan Kumar, et al., MMwave Radar Radome Design Guide (Texas Instruments 2021).
Chethan Kumar, User's Guide: 60GHz MMwave Sensor EVMS (Texas Instruments 2020).
Ching-Yao, et al., Evaluation of Magnetic Markers as a Position Reference System for Ground Vehicle Guidance and Control (UC Berkeley 2003).
Choosing Materials to Shield a Home Agaisnt Microwave Radiation (eiwellspring.org 2017).

\* cited by examiner

VEHICLE GUIDANCE SYSTEM

RELATED APPLICATIONS

This application is a continuation and claims the benefit of U.S. patent application Ser. No. 16/602,094, filed on Aug. 9, 2019, entitled "Vehicle Guidance System," which in turn claims priority to the PCT/US2018/019047 entitled "Vehicle Guidance System," filed on Feb. 21, 2018 which in turns claims priority to the U.S. provisional patent application No. 62/600,593, filed on Feb. 23, 2017, entitled "Vehicle Guidance System." The entire disclosures of the aforementioned earlier applications are incorporated by reference herein.

TECHNICAL FIELD

This disclosure relates generally to a method and apparatus for automated or semi-automated guidance of vehicles along a pathway and more particularly relates to a vehicle guidance or guidance-assist system using downward-looking radar that receives reflections back from microwave reflectors along the pathway.

BACKGROUND

Using radar sensors to detect objects has been known and used for the last century. For example, radar has been used for the guidance of airborne ordnance delivery vehicles, such as guided missiles and airplanes. Currently, radar sensors in automotive or land vehicles are aimed forward or sideways to detect objects for collision avoidance and automated cruise control. Forward-looking radar systems have been developed for highway motor vehicle guidance, i.e., steering.

BRIEF DESCRIPTION OF THE DRAWINGS

The foregoing and additional features and advantages of example embodiments will become more readily apparent from the following detailed description of example embodiments, made with reference to the following drawings.

DETAILED DESCRIPTION OF EMBODIMENTS

Preface

Figure 1A:
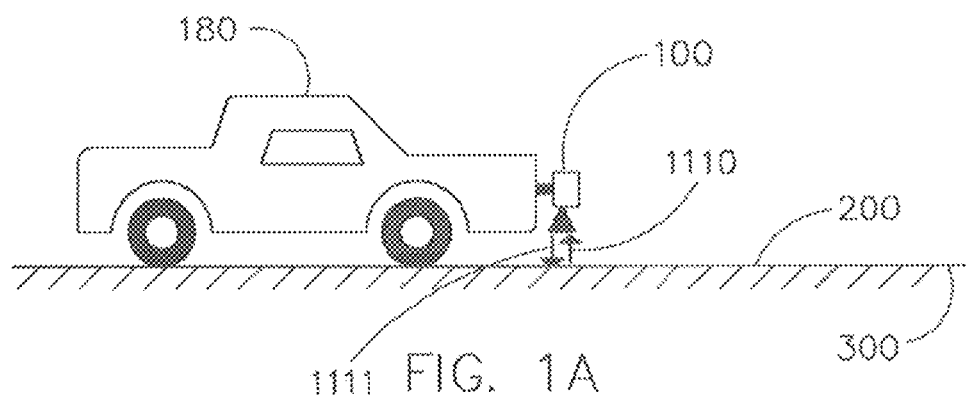
FIG. 1A is a side pictorial view of a vehicle guidance system showing a vehicle, a radar sensor, a roadway, and a microwave reflector, according to one embodiment.

With reference to the above-listed drawings, this section describes particular embodiments and their detailed construction and operation. The embodiments described herein are merely examples, set forth by way of illustration only and not limitation. Those skilled in the art will recognize in light of the teachings herein that there are alternatives, variations and equivalents to the example embodiments described herein. For example, other embodiments are readily possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Overview

This overview is provided to introduce a selection of concepts in a simplified form that are further described later in greater detail. This overview is not intended to identify key or essential inventive concepts of the claimed subject matter, nor is it intended for determining the scope of the claimed subject matter.

A radar vehicle guidance system can be used in guiding a land vehicle along a pathway. One embodiment has a downward-looking, lateral position-sensing, tracking radar guidance apparatus, such as an inexpensive radar system with an antenna array. A microwave reflector, such as metallic paint, is distributed along the roadway path in the direction of vehicle travel similar to painting the side lines, preferably longitudinally along the center of a vehicle lane. The vehicle may be automatically steered to follow the metallic paint. A downward-looking radar allows for tight turns to be negotiated without any concern for false targets. Since the distance to the surface is short, low-power radar can be used without any interference to other systems. A painted line with metal particles provides an inexpensive and robust guideline without environment concerns of ground moisture, mapping capabilities, frost or subsurface movement. The guidance system control can be similar to well-known embedded wire systems without any active roadway infrastructure.

Another embodiment has a downward-looking, lateral position-sensing UWB (Ultra Wide Band) impulse radar system with a multiple-antenna array. A microwave reflector, such as a metallic paint, tape, strip, metallic mesh, corner reflectors, frequency-selective surfaces, round wire, flat conductor, or pipe can be distributed along the roadway path in the direction of vehicle travel on the pathway surface or slightly below the surface, preferably longitudinally along the center of a vehicle lane. The vehicle can be automatically steered to follow the microwave reflector.

Another embodiment has a downward-looking impulse radar sensor mounted to the vehicle for use in guiding a land vehicle along a pathway, wherein the radar sensor consists of a plurality of receive/transmitter antennas and a signal processor coupled to receive signals received by the antennas to determine path lengths from each antenna to the microwave reflector to guide the vehicle along the pathway. A microwave reflector has different reflective properties than the pathway and is distributed along the pathway in the direction of vehicle travel.

Another embodiment is a method for guiding a vehicle along a pathway by directing radar waves downward toward the ground and an installed elongated microwave reflector distributed along the pathway, receiving radar waves form the ground and the microwave reflector, processing the received radar waves with the transmitted radar waves to determine the position of the elongated microwave reflector respect to the vehicle, and guiding the vehicle to follow the elongated microwave reflector.

The radar systems described herein have, in certain cases, the advantage that it is an active system giving all-weather and day-or-night performance and has the inherent capability of sensing distance and direction to targets.

Example Embodiments

Figure 1B:
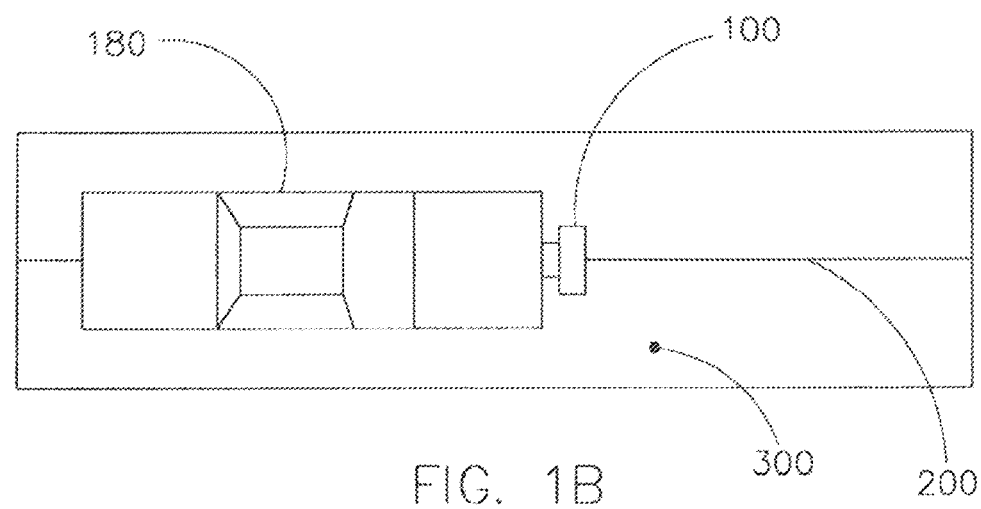
FIG. 1B is a top pictorial view of the system shown in FIG. 1A.

FIGS. 1A and 1B show the side view and top view, respectively, of a preferred embodiment of a vehicle guidance system. A vehicle 180 traveling down a roadway or pathway 300 following a microwave reflector 200 using a downward looking radar sensor 100. The pathway 300 where the microwave reflector 200 can be installed is not limited to roads, streets, and highways, but could include lawns, fields, open terrain, rooms in a building, parking lots, warehouses, depots, and manufacturing floors. The microwave reflector 200 could be implemented on the surface or slightly below the surface. The vehicle 180 can be any mobile platform such as, for example, a car, truck, tractor-trailer, motorcycle, lawnmower, motorized wheelchair, utility vehicle, mining equipment, golf cart, or tractor. In FIG. 1A, the radar sensor 100 sends signals 1111 to the road surface 300 and the microwave reflector 200 and receives signals 1110 from the road surface 300 and the microwave reflector 200. The received signals 1110 are processed to determine an approximate position of the microwave reflector 200 relative to the radar sensor 100, which is attached to the front of the vehicle 180, and therefore, the position of the front of the vehicle 180 relative to the microwave reflector 200. The position of the vehicle 180 relative to the microwave reflector 200 is used to guide the vehicle 180 along the path of the microwave reflector 200.

Figure 2A:
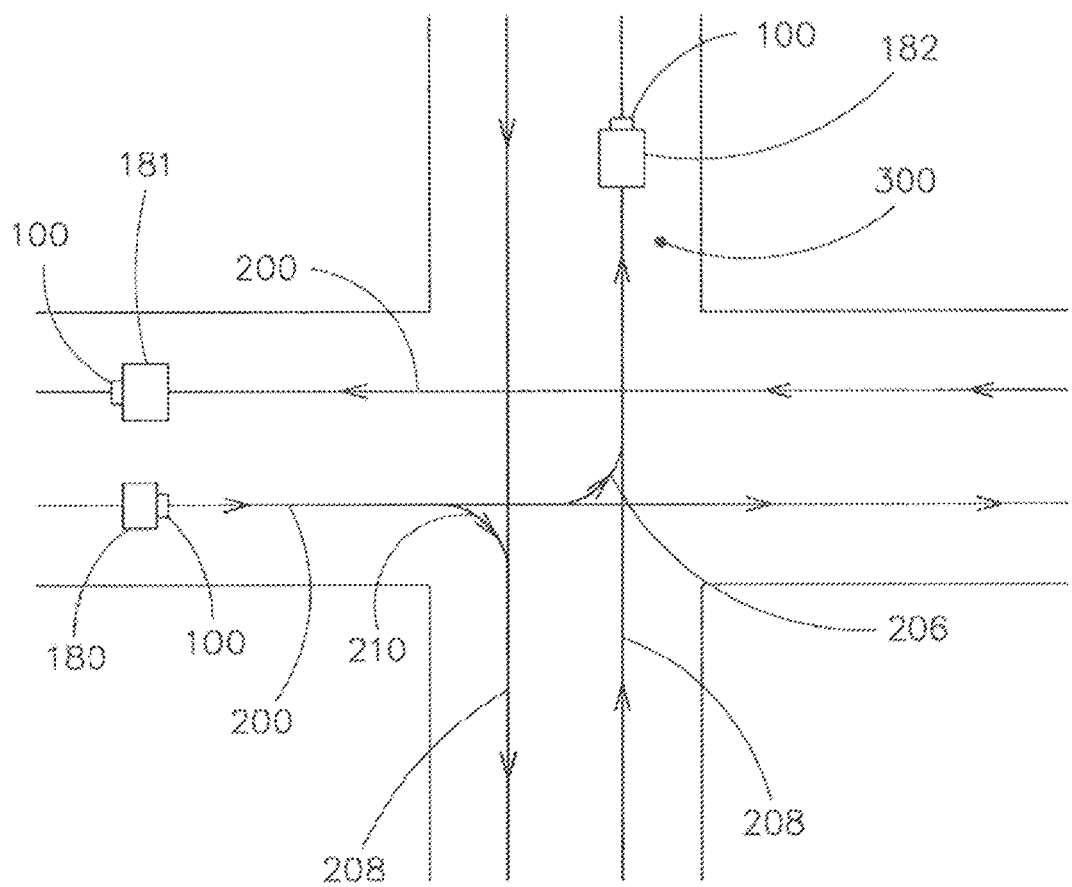
FIG. 2A is a top view of vehicles in a roadway intersection with different microwave reflectors designating different paths of the vehicles, according to one embodiment.
Figure 2B:
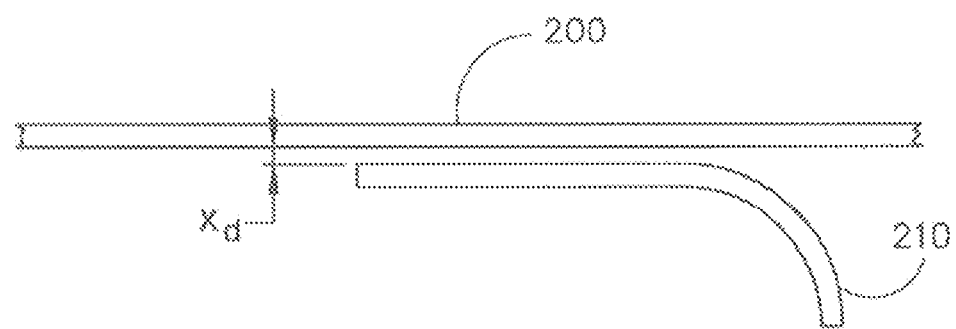
FIG. 2B is a top view of two microwave reflectors separated by physical distance.
Figure 2C:
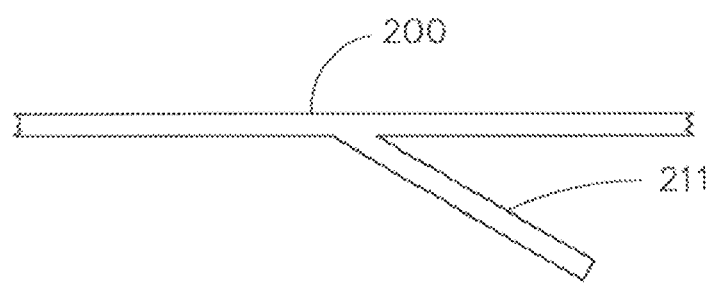
FIG. 2C is a top view of two microwave reflectors connected together.

FIGS. 2A, 2B, and 2C show how several vehicles 180, 181, and 182 attached with the radar sensor 100 are guided through an intersection using a preferred embodiment. As shown in FIG. 2A, the vehicle 180 uses the radar sensor 100 to detect the path of the microwave reflector 200 to follow the roadway until the vehicle 180 moves into the intersection where it encounters a Y in the microwave reflectors materials 200 and 210. FIGS. 2B and 2C illustrates in more detail two examples of the Y section in the microwave reflector 200. FIG. 2B shows that the microwave reflector 200 follows a straight path, whereas the microwave reflector 210 veers off to the right. Since the radar is looking downward, rather than forward, the radar sensor 100 detects the two microwave reflectors 200 and 210, and the vehicle's computer (not shown in this figure) directs the vehicle 180 to follow either microwave reflector 200 or 210. As an example of operation in FIG. 2A, the vehicle 180 tracking the microwave reflectors 200 and 210 would like to turn right at the intersection. As the vehicle 180 enters the intersection, the vehicle computer would select to follow microwave reflector 210. Once the right turn is made, the radar sensor 100 would detect microwave reflectors 210 and 208, and the vehicle computer would select the microwave reflector 208 to follow. The microwave reflectors 200 and 210 can either be made of the same microwave reflective materials or two different types of microwave reflective materials.

FIG. 2B shows that there is physical separation between the microwave reflector 200 and 210 by distance $x_d$, whereas FIG. 2C shows no separation prior to the Y feature. There may be other configurations where two or more microwave reflectors might be necessary or desirable. The vehicle 180 is assumed to be a car or pickup truck, but there are situations where articulated vehicles, such as tractor-trailers, need to make a left turn prior to turning right to prevent the trailer from running over the sidewalk. In a similar manner as shown in FIG. 2A, vehicles 181 and 182 can follow the different microwave reflectors 200, 206, 208, and 210 using the radar sensor 100 to travel to the desired destination. FIG. 2A does not show all the possible turns and configurations the vehicles could make in or near an intersection.

Figure 3A:
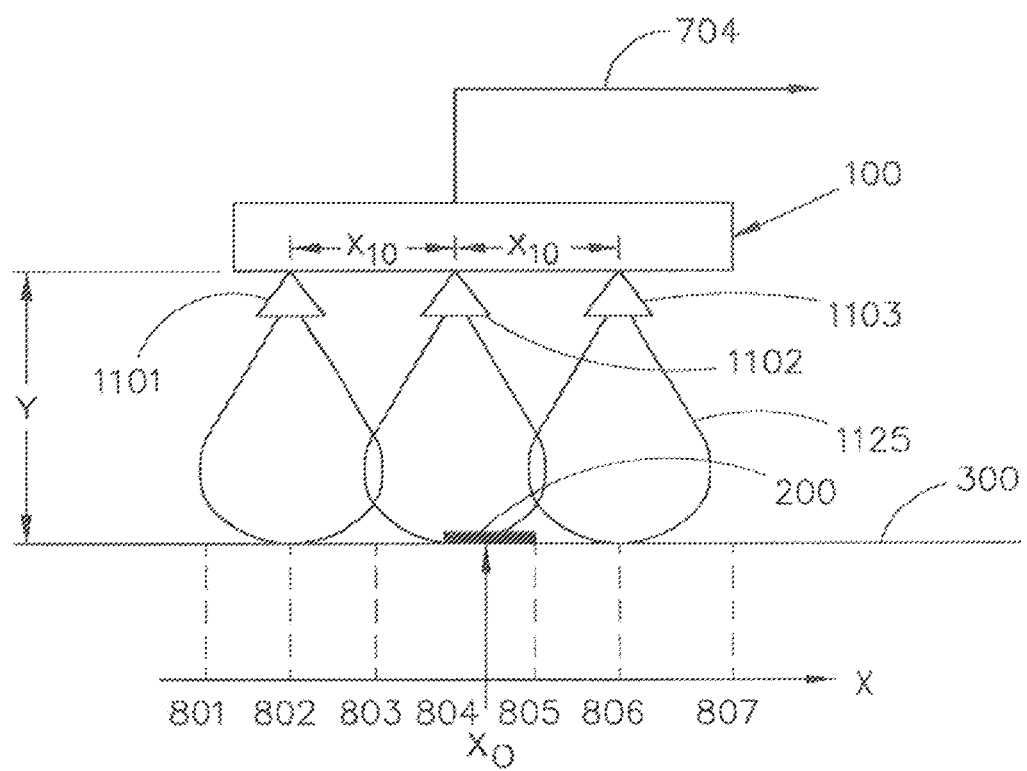
FIG. 3A is a front pictorial view of the radar sensor with several antennas illuminating microwave reflectors on a roadway, according to one embodiment.
Figure 3B:
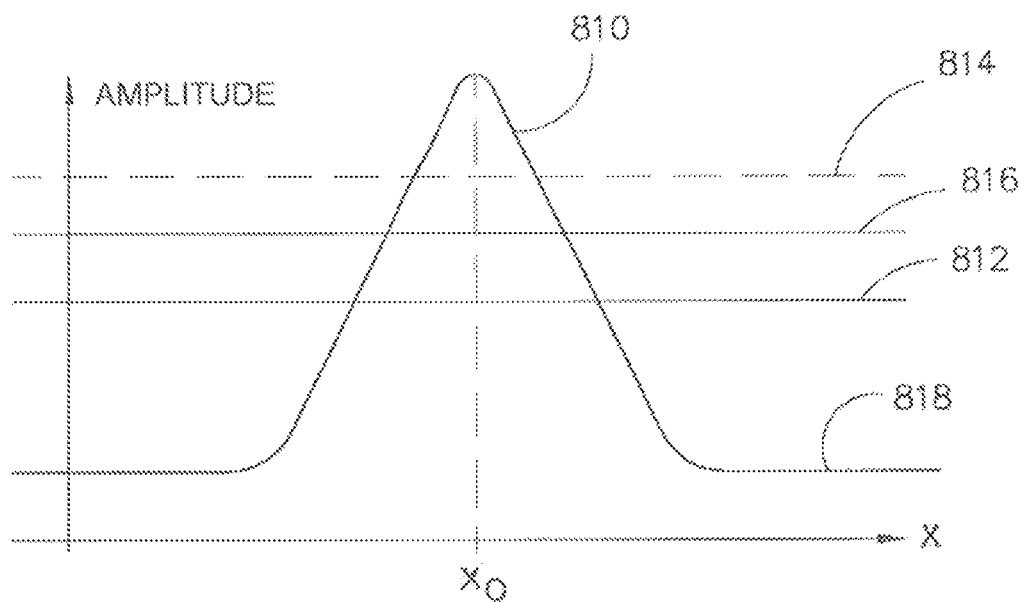
FIG. 3B is a graph of a return radar signal versus lateral distance from the microwave reflector from FIG. 3A.
Figure 3C:
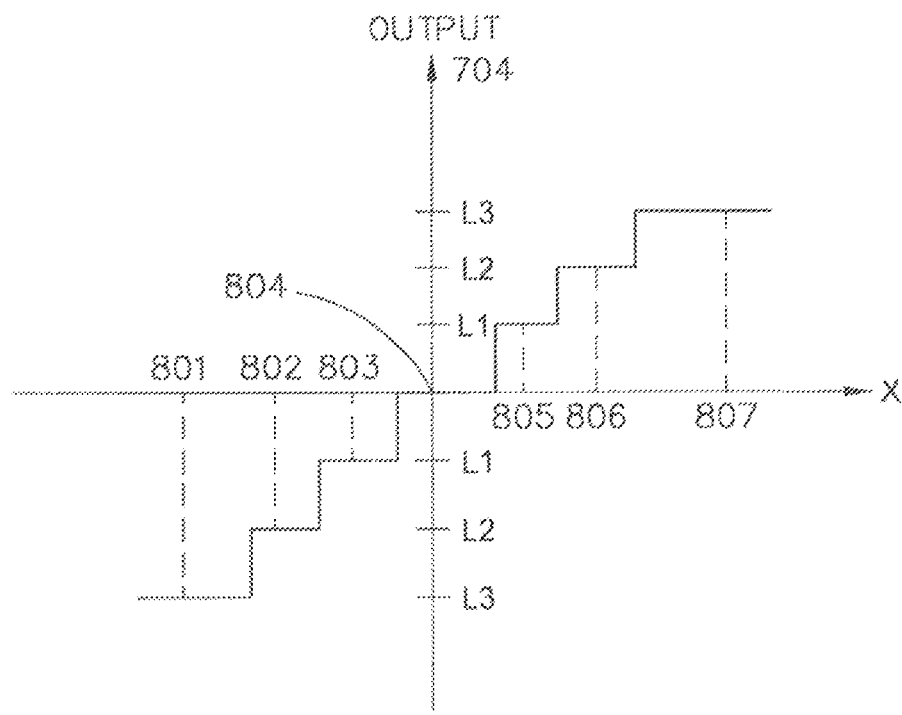
FIG. 3C is a graph of an output of a radar sensor versus lateral distance from the microwave reflector from FIG. 3A.

FIGS. 3A, 3B, and 3C illustrate one embodiment of the downward looking radar sensor 100 in operation. FIG. 3A shows one embodiment of the radar sensor 100 with three transmitting and receiving antennas 1101, 1102, and 1103 perpendicular to vehicle travel and spaced by distance $x_{10}$ between adjacent antennas, at distance of y above the roadway 300 and the microwave reflector 200. The spacing of the antennas can be equal distances as shown in FIG. 3A for equal resolution or at different distances to provide more resolution near the center of the radar sensor 100 than towards the end sections. The radar sensor 100 transmits signals and receives signals via a beam pattern 1125. The microwave reflector 200 in this embodiment provides a different return signal than the roadway 300, as illustrated in FIG. 3B, which is the graph of the return signal amplitude over the microwave reflector 200. When the radar antenna 1102 is directly above position $x_o$, the amplitude of the returned signal 810 is at its maximum value. If the antenna 1102 is slightly to the left or right of this position, the amplitude would be a level 814. Further to the left or right, the signal amplitude 810 would be at levels 816 or 812. If the radar antenna 1102 is over the roadway 300 and not close to the microwave reflector 200, then the returned signal amplitude 810 would at level 818. If the received signals are processed from all three antennas, then the output 704 can be derived for the displacement of the radar sensor 100 in the lateral direction, x. FIG. 3C shows the output 704 of the radar sensor 100 vs. the distance x from the microwave reflector 200. At the center position 804, $x_0$, the radar sensor 100 is directly centered with the microwave reflector 200. Therefore, the output 704 is zero and no steering correction is needed. If the radar sensor 100 were mounted on the center of the front of the bumper, the vehicle would be following the microwave reflector precisely along the microwave reflector 200. If the radar sensor 100 moves slightly to the right or left to positions 805 or 803, the radar output 704 would be a +L1 level or −L1 level, respectively. The vehicle computer receiving this information from the radar sensor 100 would steer the vehicle to minimize this error. Likewise, at positions 806 and 807, the radar sensor 100 has moved too far to the right, and therefore, the output 704 would be greater, at levels +L2 and +L3, respectively. Similarly, at positions 802 and 801, the radar sensor 100 has moved too far to the left, and therefore, the output 704 would be negative and at greater amplitude, at levels −L2 and −L3, respectively. The output 704 can be used as a guidance signal for the vehicle to direct the steering mechanism to alter the vehicle lateral direction so that the vehicle follows the microwave reflector 200. Alternatively, the output 704 can be used as a prompting signal to alert the driver that a steering correction is recommended to better follow the microwave reflector 200.

Figure 4A:
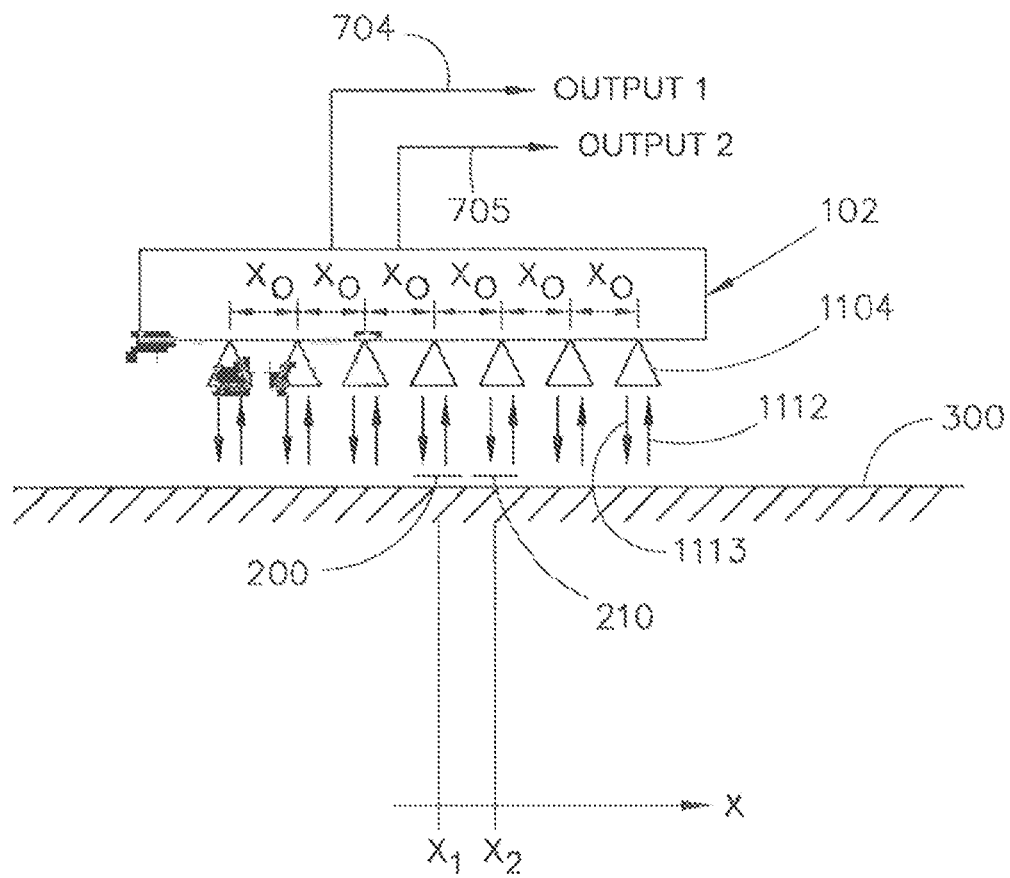
FIG. 4A is a front pictorial view of another radar sensor with several antennas illuminating two microwave reflectors on a roadway, according to another embodiment.
Figure 4B:
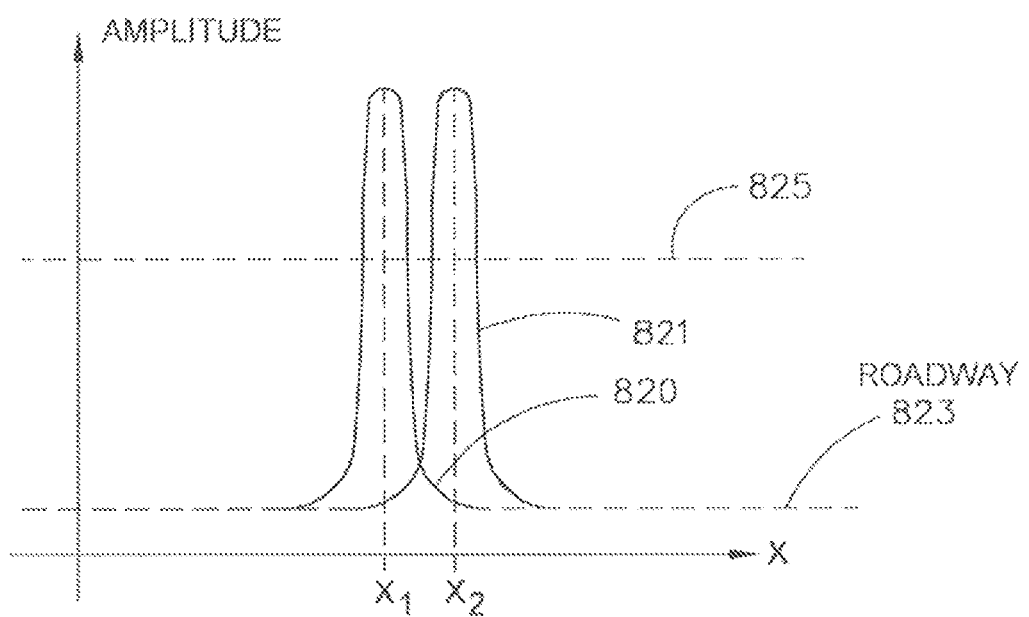
FIG. 4B is a graph of return radar signals versus lateral distance from two microwave reflectors as in FIG. 4A using a narrow antenna beam pattern.

FIGS. 4A-4E illustrate another embodiment of a system with two different microwave reflectors. FIG. 4A shows two different microwave reflectors 200 and 210 with different microwave reflective properties or with the same reflective properties but separated by a physical distance. The microwave reflector 200 reflects frequencies in a first frequency region such as a region around 10 GHZ, and the other microwave reflector 210 reflects frequencies in a second frequency region such as a region around 24 GHz. The radar sensor 102 transmits and receives both frequency regions via a plurality of the antennas 1104. Each antenna 1104 transmits both frequencies via signals 1113 and receives both signals 1112 from the roadway surface 300 and the two microwave reflectors 200 and 210. The radar sensor 102 can process the signals at the two different frequencies from the different surfaces similarly to what is illustrated in FIG. 4B. In FIG. 4B, the signal 820 is a return amplitude from the antenna for the first frequency region moving in the x direction, which is lateral to the direction travelled. $X_1$ is the position where the antenna 1104 is over the microwave reflector 200. Similarly, the signal 821 is a return amplitude from the antenna for the second frequency region moving in the x direction, which is lateral to the direction travelled. $X_2$ is the position where the antenna 1104 is over the microwave reflector 210. The radar sensor 102 outputs a signal 704 for tracking the microwave reflector 200 and a signal 705 for tracking the microwave reflector 210 relative to the movement over the radar sensor 102 in the lateral direction X. A guidance computer on the vehicle can select between either microwave reflectors to follow and, therefore, the path the vehicle take on the roadway. The microwave frequencies selected for the various microwave reflectors, one or more, to reflect or absorb can be close in frequency, e.g., 10.0 and 10.5 GHz, or far apart, e.g., 10 GHz and 122 GHz. In some configurations, two or more microwave reflectors will have multiple selective frequency surfaces and the radar sensor can process the multiple microwave reflectors and provide the guidance computer with multiple paths to follow.

Figure 4C:
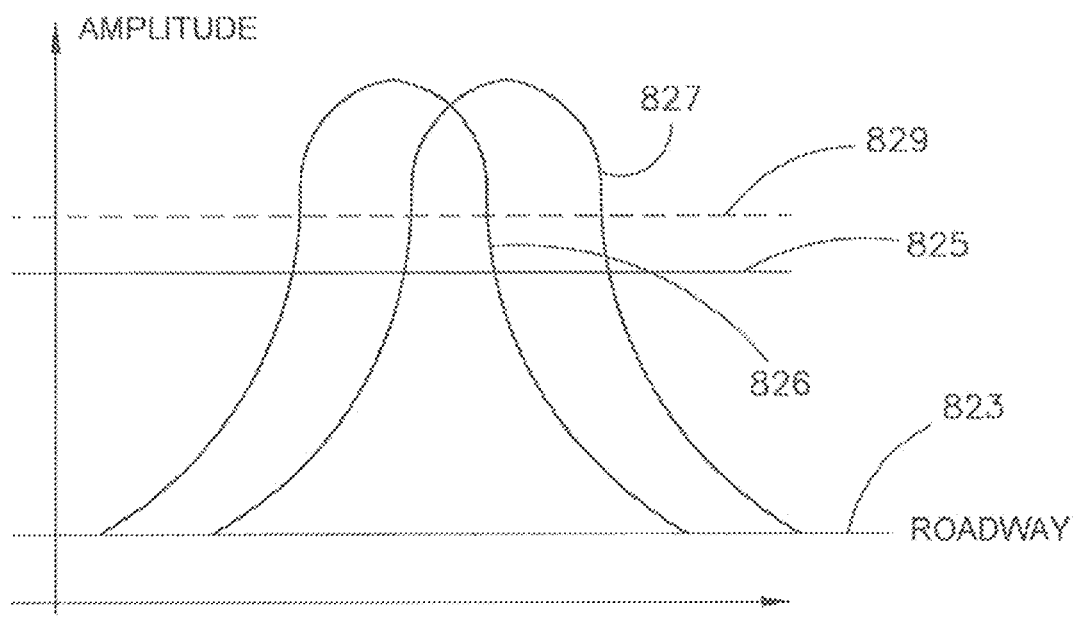
FIG. 4C is a graph of return radar signals versus lateral distance from two microwave reflectors as in FIG. 4A using a wider antenna beam pattern.
Figure 4D:
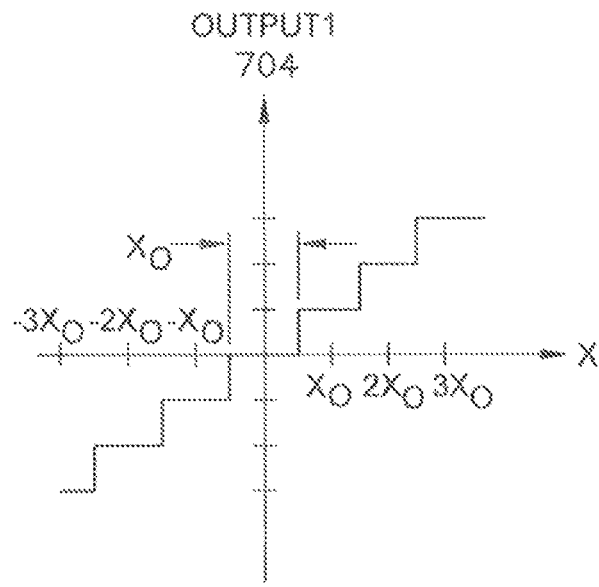
FIG. 4D is a graph of an output of the radar sensor versus lateral distance from a first microwave reflector in FIG. 4A.
Figure 4E:
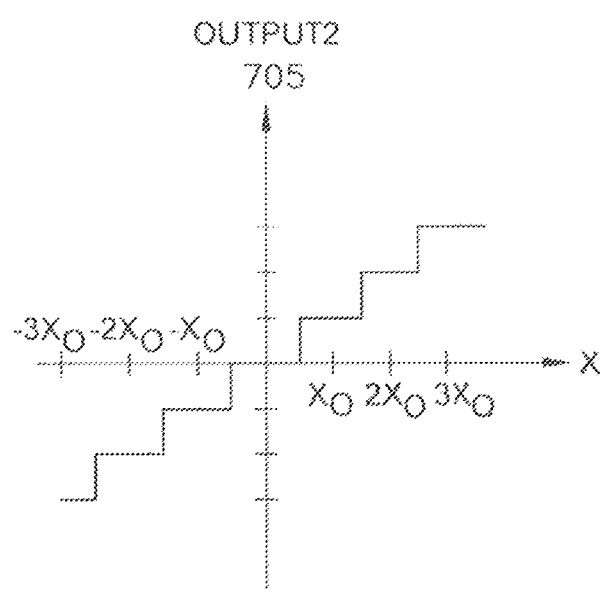
FIG. 4E is a graph of an output of the radar sensor versus lateral distance from a second microwave reflector in FIG. 4A.

FIG. 4B shows narrow beamwidths of the antenna 1104. Therefore, a single detection level 825 suffices to indicate that the antenna 1104 is over the microwave reflector 200. FIG. 4C shows broader beamwidths of the antenna 1104, and, therefore, several detection levels such as 825 and 829 may be utilized. The roadway return signal is shown to be at level 823 for both antenna beamwidths. Narrow antenna beamwidths provide a more defining signal when over the microwave reflector 200 and, therefore, fewer false detections, but more antennas may be required to provide similar resolution to that of broader beamwidth antennas. Higher microwave frequencies, such as 122 GHz, require smaller antennas than lower microwave frequencies, such as 5 GHz, for similar antenna beamwidths. FIGS. 4D and 4E show the outputs 704 and 705, respectively, of the radar sensor 102 of the error level versus the X direction.

Figure 5:
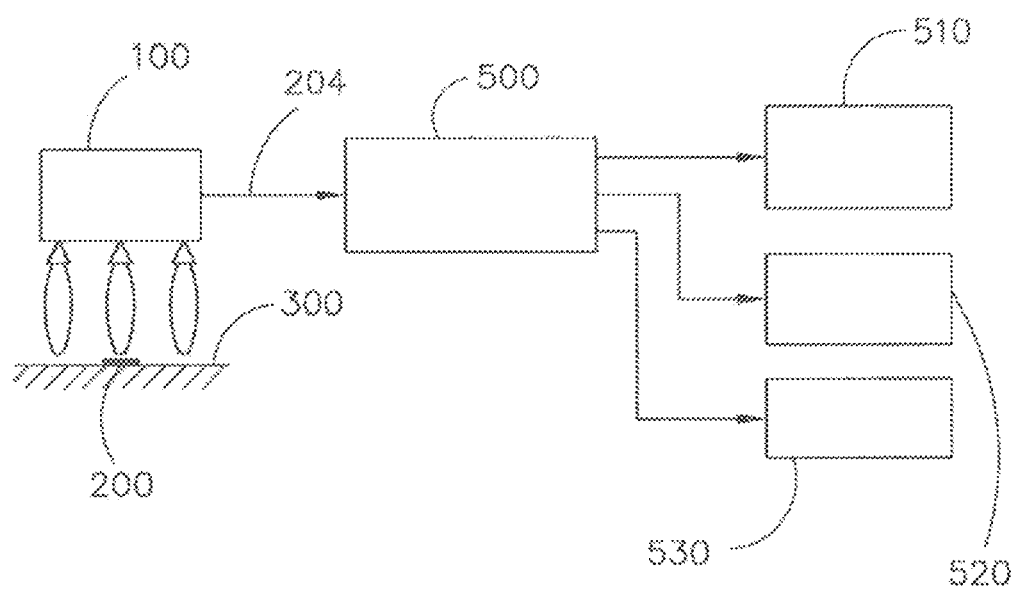
FIG. 5 is a block diagram of a vehicle guidance system, according to one embodiment.

FIG. 5 shows a block diagram of the vehicle guidance system which includes the radar sensor 100, a vehicle controller or guidance computer 500, a vehicle steering system 510, a speed control system 520, and a vehicle location system 530. The output 704 of the radar sensor 100, which detects the position of the microwave reflector 200 relative to the radar sensor 100, is sent to the vehicle controller 500. The vehicle controller 500 sends signals based on information from the radar sensor 100 and possibly other sensors (not shown) to the steering system 510, speed control system 520, and the vehicle location system 530. The vehicle controller 500 is programmed to steer the vehicle in an appropriate direction to follow the microwave reflector 200 in this embodiment.

Figure 6A:
FIG. 6A is a top pictorial view of a microwave reflector as a flat reflector.
Figure 6B:
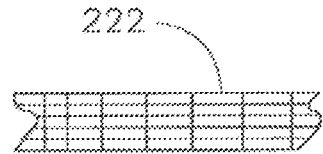
FIG. 6B is a top pictorial view of a microwave reflector as a metallic mesh.
Figure 6C:
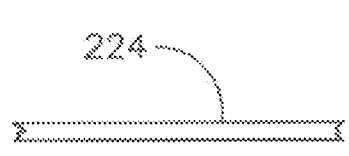
FIG. 6C is a top pictorial view of a microwave reflector as a narrow flat reflector.
Figure 6D:
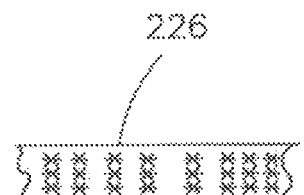
FIG. 6D is a top pictorial view of a microwave reflector as a small microwave corner reflectors.
Figure 6E:
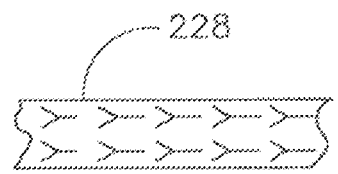
FIG. 6E is a top pictorial view of a microwave reflector as a frequency-selective surface using Y dipoles.
Figure 6F:
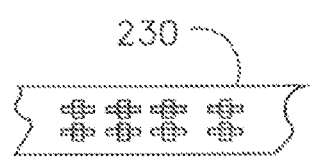
FIG. 6F is a top pictorial view of a microwave reflector as a frequency-selective surface using rectangular loops.
Figure 6G:
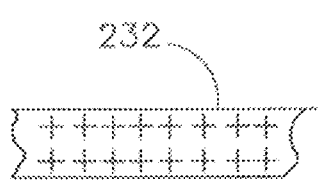
FIG. 6G is a top pictorial view of a microwave reflector as a frequency-selective surface using cross dipoles.
Figure 6H:
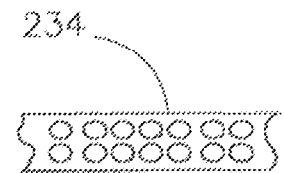
FIG. 6H is a top pictorial view of a microwave reflector as a frequency-selective surface using round loops.
Figure 6I:
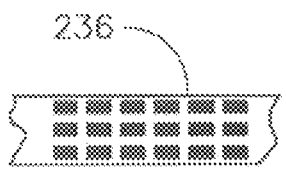
FIG. 6I is a top pictorial view of a microwave reflector as a frequency-selective surface using solid loops.
Figure 6J:
FIG. 6J is a top pictorial view of a microwave reflector as a frequency-selective surface using angle dipoles.
Figure 6K:
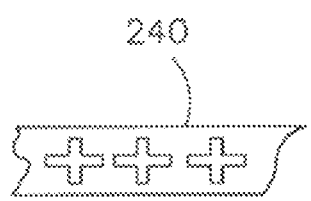
FIG. 6K is a top pictorial view of a microwave reflector as a frequency-selective surface using cross loops with end dipoles.
Figure 6L:
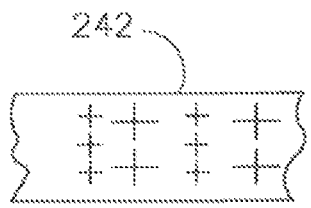
FIG. 6L is a top pictorial view of a microwave reflector as a frequency-selective surface using small and large cross dipoles.
Figure 6M:
FIG. 6M is a top pictorial view of a microwave reflector as a wire.
Figure 6N:
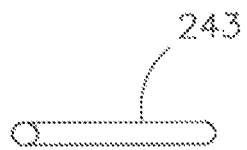
FIG. 6N is a top pictorial view of a microwave reflector as a pipe.

The microwave reflectors that are illustrated in various embodiments are made out of materials to either absorb or reflect microwave frequencies compared to the ground or roadway surfaces. FIGS. 6A-6N show some of the configurations, but there are many combinations. FIG. 6A a shows microwave reflector 220, which is a metallic paint, tape, or strip and, typically, provides a reflected return signal that is significantly different than the roadway surfaces 300. And the return signal would be similar over the transmitting frequency. FIG. 6B shows a microwave reflector 222 made of a metallic mesh such as aluminum or metal screen wire. The return signal depends on the mesh size and/or spacing and can be made to be a frequency-selective surface by the pattern and size of the pattern. The metallic mesh would be easier to install in soil near the surface without affecting plants and water runoff. FIG. 6C shows a microwave reflector 224, which can be applied as a metallic paint, tape, or strip, but the width of the reflector is narrow. FIG. 6D shows a microwave reflector 226, which contains small metallic corner reflectors attached to a tape, strip, or roadway. These corner reflectors provide a high returned signal regardless of whether the antenna angle is aligned relative to the microwave reflector. FIGS. 6E-6K show microwave reflectors that are frequency-selective surfaces that can attached to the roadway with tape, paint, or strips. These frequency-selective surfaces may made up of many small dipoles, loops, or combination of both in a repeatable pattern. FIG. 6E shows a microwave reflector 228 with Y dipoles. FIG. 6F shows a microwave reflector 230 made up of rectangular loops. FIG. 6G shows a microwave reflector 232 with cross dipoles. FIG. 6H shows a microwave reflector 234 with round loops. FIG. 6I shows a microwave reflector 236 with solid loops. FIG. 6J shows a microwave reflector 238 with angle dipoles. FIG. 6K shows a microwave reflector 240 with a combination of cross loops with end dipoles. Many configurations are possible. Each configuration of a microwave reflector with frequency-selective surfaces will have certain amplitude, phase, and frequency response characteristics. FIG. 6L shows a microwave reflector 242 with small and large cross dipoles. The reflector 242 can have dual frequency characteristics. With a radar sensor transmitting and receiving both frequencies, the vehicle guidance computer will have two signals to track the same reflector, creating system redundancy. FIG. 6M shows a microwave reflector 241 made up a conductor, which can be either a round wire or a flat wire. Higher resolution radars can track a narrow reflector, such as an appropriately sized reflector 241. FIG. 6N shows a microwave reflector 243 made of a metallic tube.

Figure 7A:
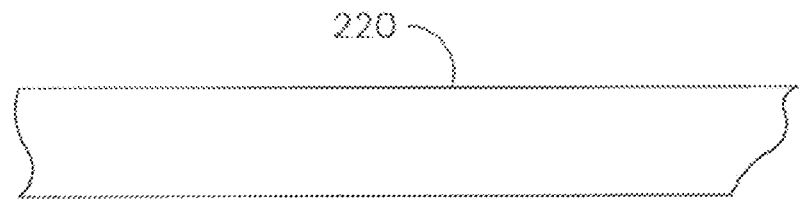
FIG. 7A is a top pictorial view of a microwave reflector, according to another embodiment.
Figure 7B:
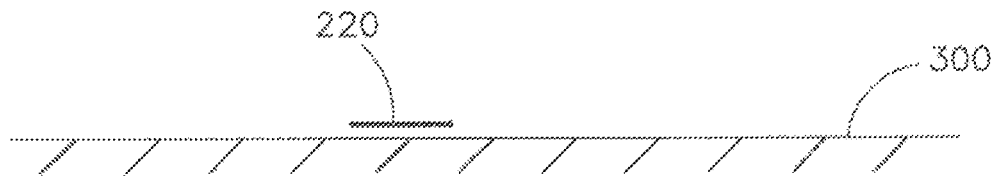
FIG. 7B is a front pictorial view of a microwave reflector on a roadway, according to one embodiment.

FIGS. 7A and 7B show top and front views of the microwave reflector 220. FIG. 7A shows the top view of the reflector 220, and FIG. 7B shows front view of the reflector 220 either painted, taped on, or installed as strip on the roadway 300. Painting a metallic material on the roadway can be done in a manner similar to current highway painting procedures except the paint is metallic and highly reflective to microwaves, whereas current highway systems use specialized paint that is highly visible to light or headlights. Thus, the procedure for painting a microwave-reflective paint involves little or no additional expense compared to current roadway line painting.

Figure 8A:
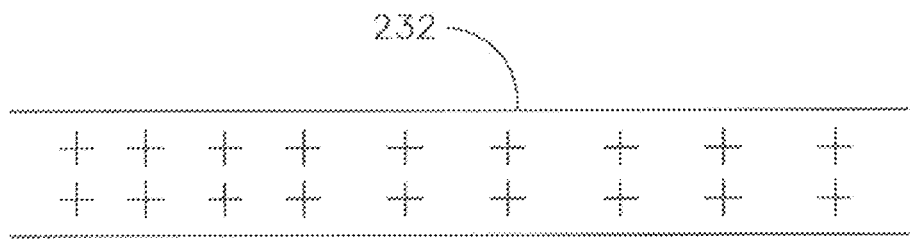
FIG. 8A is a top pictorial view of a microwave reflector as a frequency-selective surface, according to one embodiment.
Figure 8B:
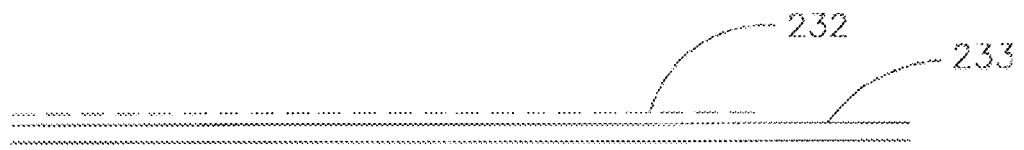
FIG. 8B is a side pictorial view of the microwave reflector in FIG. 8A.

FIGS. 8A and 8B show the top and side views of the microwave reflector 232. FIG. 8A shows the top view of the reflector 232 with a crossed dipole pattern making this surface microwave frequency selective. FIG. 8B shows the pattern painted on a specialized substrate 233 which enhances its frequency properties. The microwave reflector 232 can be created by painting a metallic pattern on the roadway with a specialized painting wheel having a cross-dipole pattern. This procedure may be more expensive than painting just the metallic paint as in FIGS. 7A and 7, but creates a frequency-selective surface.

Figure 9A:
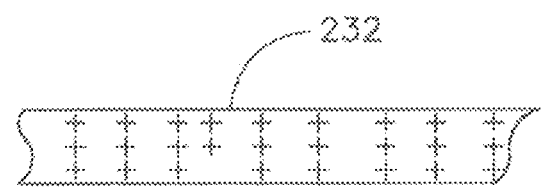
FIG. 9A is a top pictorial view of a microwave reflector as another frequency-selective surface, according to another embodiment.
Figure 9B:
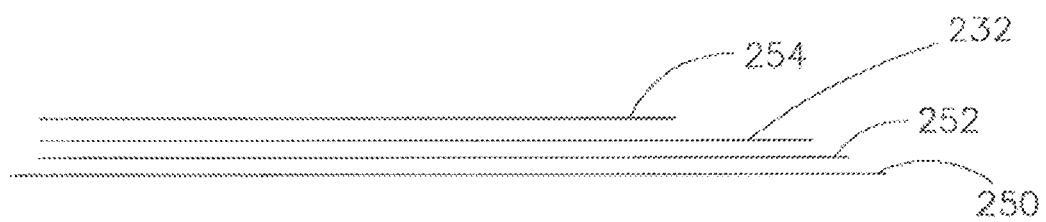
FIG. 9B is a side pictorial view of the microwave reflector in FIG. 9A.

FIGS. 9A and 9B show another embodiment of the microwave reflector 232. FIG. 9A shows a top microwave reflector 232 with cross dipoles. FIG. 9B shows a side view of the microwave reflector 233, which acts as a microwave frequency absorber over certain frequencies. In this embodiment, the microwave reflector is a tape with the metallic cross dipole pattern 232, sandwiched between two dielectric materials 252 and 254 over a metallic ground plane 250. The tape can be applied to the roadway surface.

Figure 10A:
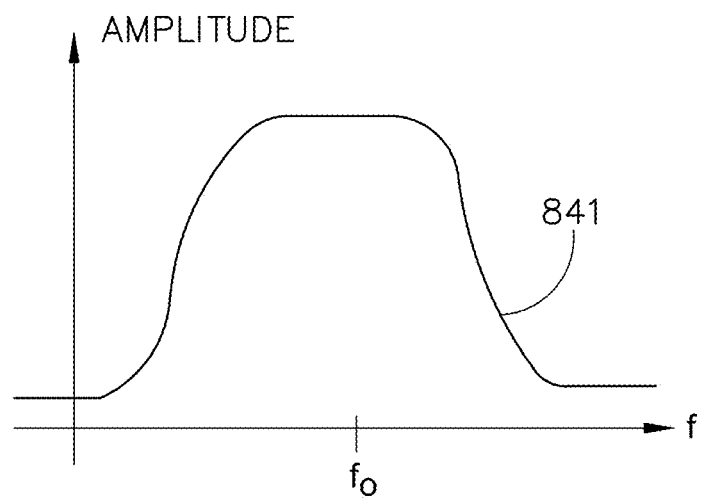
FIG. 10A is a graph of a returned radar signal vs. frequency transmitted from a frequency-selective surface with reflective properties.
Figure 10B:
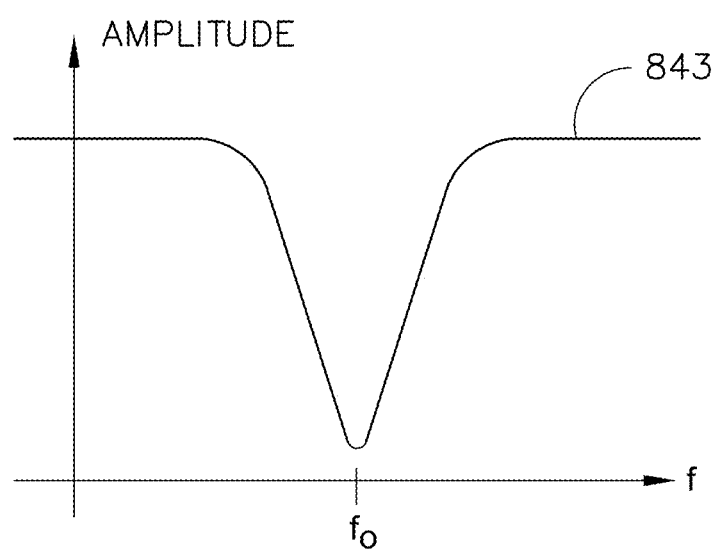
FIG. 10B is a graph of a returned radar signal vs. frequency transmitted from a different frequency-selective surface with absorption properties.

FIGS. 10A and 10B show returned signal amplitude vs. frequency transmitted. FIG. 10A shows the frequency bandpass response from the reflected signals with a frequency-selective surface that reflects the band of frequencies. FIG. 10B shows the frequency bandstop response from the reflected signals with a frequency-selective surface such as the one in FIG. 9B. In some embodiments, the radar sensor is designed to track a null for the microwave reflector instead of high amplitude signal.

The downward-looking radar sensor 100 in FIG. 1 can utilize a variety of types of radar such as, for example, CW (Continuous Wave), monopluse, dual-frequency, FMCW (Frequency Modulated Continuous Wave), UWB, UWB impulse radar, or a combination of various types. The radar preferably operates at microwave frequencies from 0.3 to 1000 GHz. The following sections illustrates embodiments of the different radar sensors.

Figure 11:
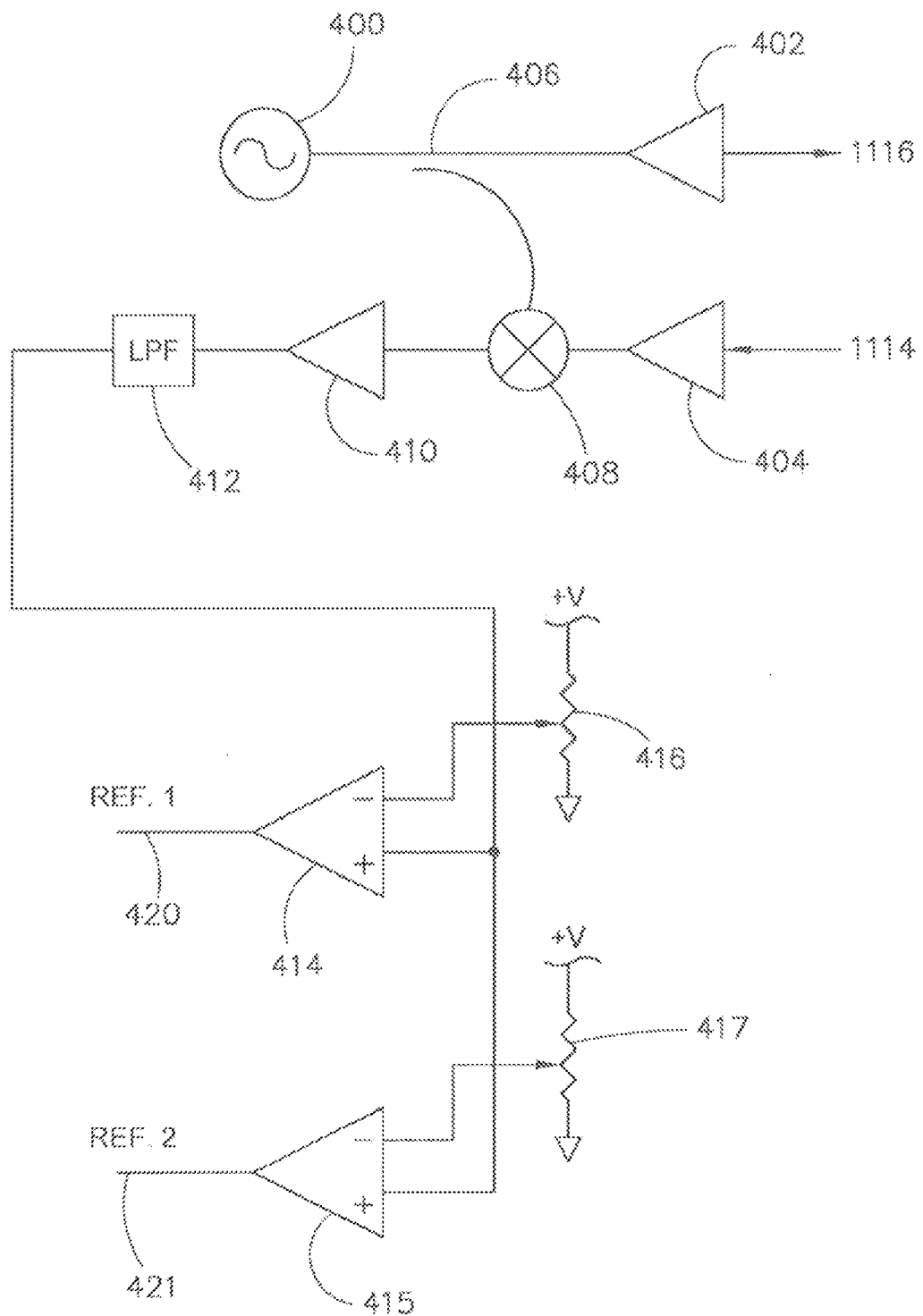
FIG. 11 is a block diagram of one type of radar sensor using Continuous Wave radar technology, according to one embodiment.

FIG. 11 shows one embodiment of a radar unit in a radar sensor assembly. One or more such radars may be needed to create the radar sensors referenced previously. In this embodiment, the radar is a CW radar that operates at microwave frequencies from 0.3 to 1000 GHz. The signal 1116 is generated by a oscillator 400 and sent out of the transmitting antenna 402. In this embodiment, the transmitting and receiving antennas are separate, but in other embodiments, a single antenna could be used both both transmission and reception. The returned signal 1114 is received by a receiving antenna 404 and converted via a mixer 408 with the transmitted signal via a path 406. The converted signal outputs a baseband signal, which is the DC amplitude of the returned signal 1114. The baseband signal is amplified by an amplifier 410 and filtered by a low-pass filter 412. The output of the filter 412 is compared to two different detection levels 416 and 417 via comparators 414 and 415, respectively. In this embodiment, the output 420 will be high if the processed signal amplitude is greater than the detection level 416. Likewise, the output 421 will be high if the processed signal amplitude is greater than the detection level 417. This embodiment shows two detection levels, but there can be a single detection level or many detection levels for each radar unit incorporated in a radar sensor system. This embodiment down-converts the microwave signals directly to baseband, but it is also possible to use a superheterodyne-type radar receiver and/or to do processing at an intermediate band.

Figure 12:
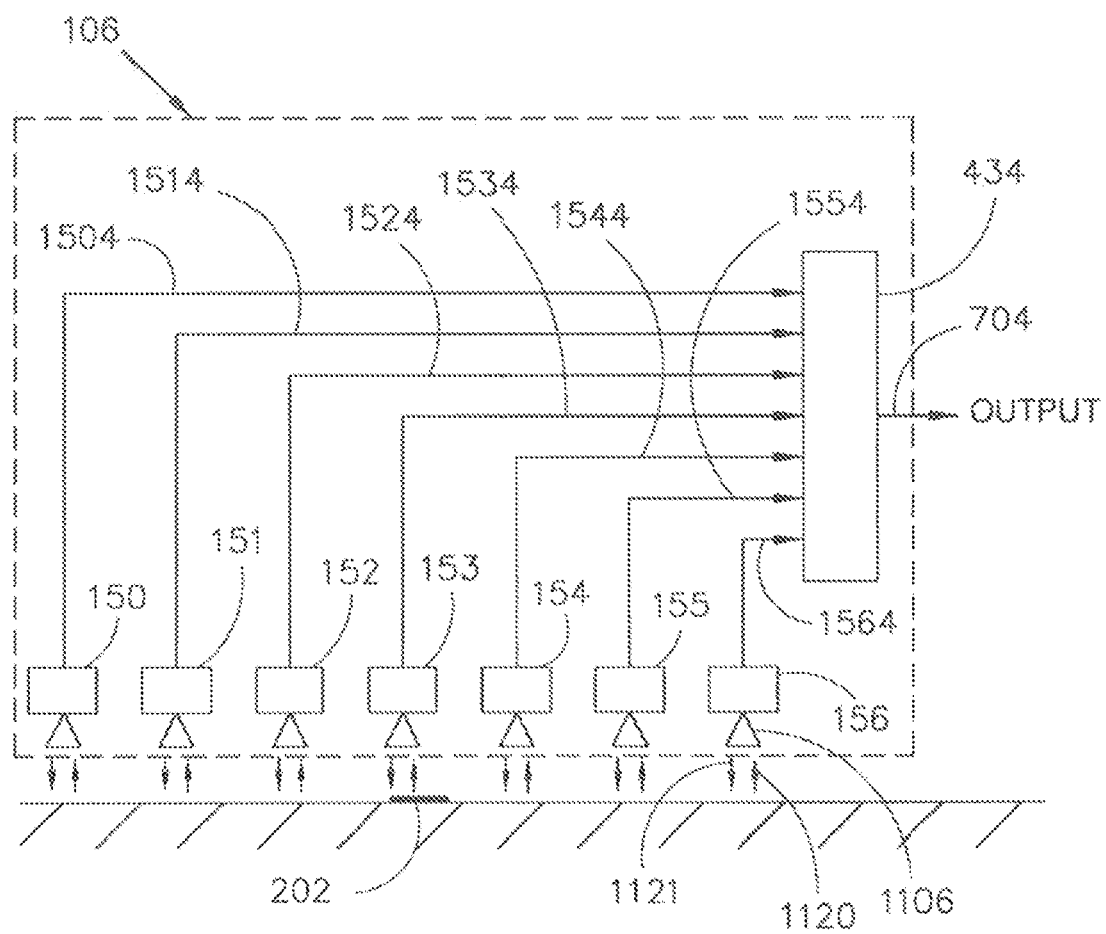
FIG. 12 is a block diagram of a radar sensor using multiple individual radars, according to one embodiment.

FIGS. 12-15 show some other embodiments of different radar configurations. FIG. 12 shows an embodiment of radar sensor 106 with seven individual radars units 150-156. Each radar unit transmits, via an antenna 1106, a signal 1121 and receives a signal 1120. The received signal 1120 is processed for detecting the surface (not labeled) or the microwave reflector 202. The radar units 150-156 each has several detection levels, and the output of each radar unit 150-156 is sent to a processor 434 via signaling lines 1504, 1514, 1524, 1534, 1534, 1544, 1554, and 1564, respectively for the radar units 150-156. The processor 434 can assign weights to each input from each radar unit and generate an outputs signal 704 similar to FIG. 3C, which shows different amplitude levels as the radar sensor 106 transverses in the lateral direction from the microwave reflector 202.

Figure 13:
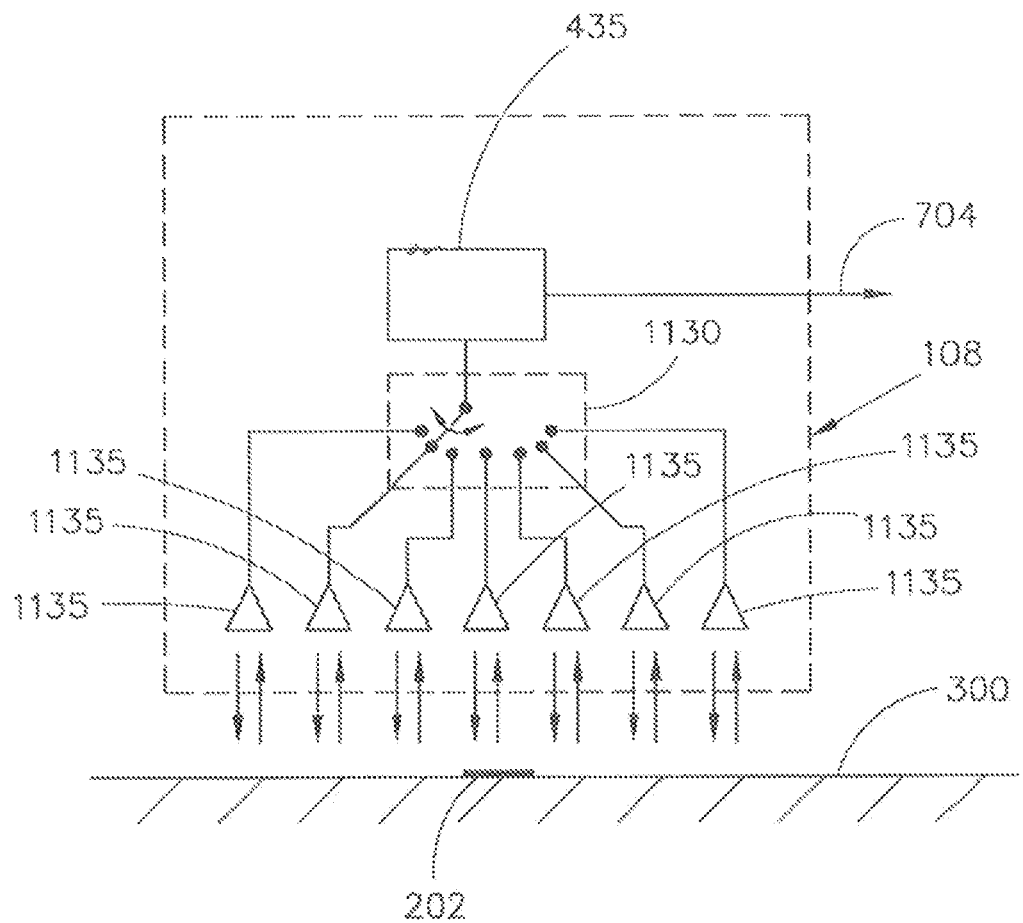
FIG. 13 is a block diagram of a radar sensor using multiple transmit/receive antennas, according to one embodiment.

FIG. 13 shows another embodiment for a radar sensor 108. The radar sensor 108 uses a single transmitter/receiver unit 435 and switches each antenna 1135 via a switch 1130. Each antenna 1135 is switched to be connected for a period of time sufficient for a signal to be sent and received from the roadway surface 300 and the microwave reflector 202 via that particular antenna. The unit 435 processes each signal from the multiple antennas and derives an output 704, which represents the position of the antennas 1135 relative to the microwave reflector 202.

Figure 14:
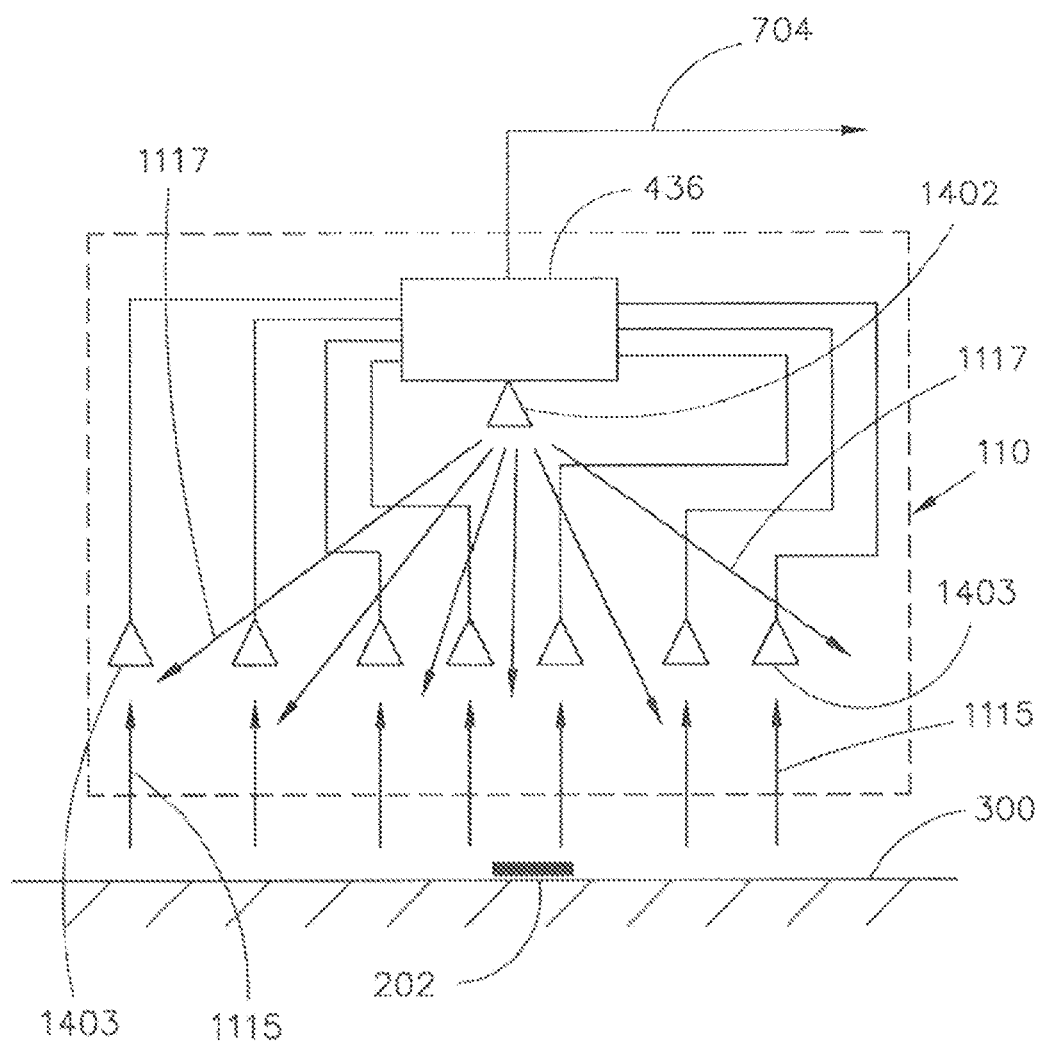
FIG. 14 is a block diagram of a radar sensor using a single transmitting antenna and multiple received antennas, according to one embodiment.

FIG. 14 shows another embodiment for a radar sensor 110. The radar sensor 110 uses a single transmitting antenna 1402 placed higher than the individual received antennas and having a wider beam antenna pattern signals 1117. The received signals 1115 are received via individual antennas 1403 and processed by a processing and RF circuitry unit 436 to provide an output 704. The output 704 represents the lateral distance of the received antennas 1403 from the microwave reflector 202.

Figure 15A:
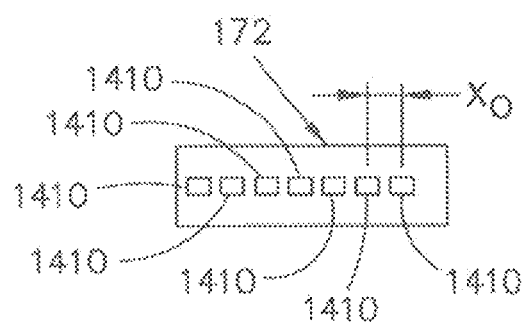
FIG. 15A is a top pictorial view of a placement of antennas on the radar sensor within a single row, according to one embodiment.
Figure 15B:
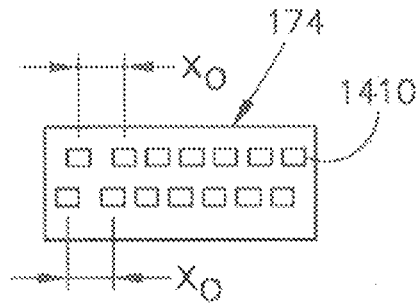
FIG. 15B is a top pictorial view of a placement of antennas on the radar sensor with two rows, according to one embodiment.
Figure 15C:
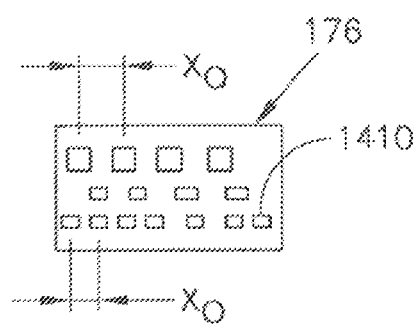
FIG. 15C is a top pictorial view of a placement of antennas on the radar sensor with multiple rows, according to one embodiment.

FIG. 15A-15C show top views of different placement of antennas 1410 for radar sensors 172, 174, and 176, respectively. If there are separate transmitting and receiving antennas, the placement can be similar but spaced slightly apart from the each other to yield a desired beamwidth pattern. In FIG. 15A, the antennas 1410 are spaced uniformly at distance $X_0$ in a horizontal row. In FIG. 15B, the antennas 1410 are in two rows with a slight offset. In FIG. 15C, the antennas are in three rows.

Figure 15D:
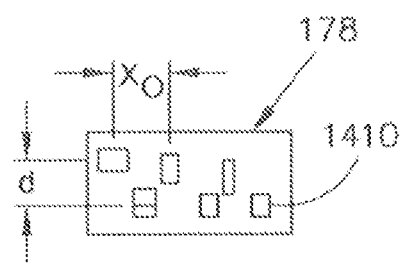
FIG. 15D is a front pictorial view of a placement of antennas on the radar sensor with two rows in different vertical placement, according to one embodiment.

FIG. 15D shows the side view of a different placement of antennas 1410 spaced both horizontally at a distance $X_0$ and vertically, at a distance d. A strong signal is likely to be received by either the top set of antennas or the bottom set of antennas depending on the distance. The antennas can be designed for two or more frequencies or multiple antennas can be used at each selective frequency.

Figure 15E:
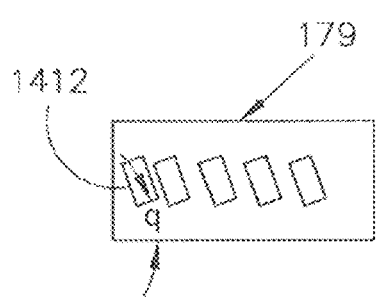
FIG. 15E is a front pictorial view of a placement of antennas on the radar sensor with angular placement, according to one embodiment.
Figure 15F:
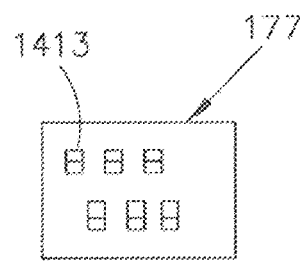
FIG. 15F is a top pictorial view of a placement of antennas on the radar sensor with front and back angular placement, according to one embodiment.

FIG. 15E shows the side view of the placement of antennas 1412 at an angle q and similar separation distance. This antenna placement allows for detecting the signals from a microwave reflector offset to the side instead of directly below. FIG. 15F shows the top view of the placement of antennas 1413 at an angle looking slightly forward or slightly backward from the radar sensor.

There are many different configurations of antenna placements and the above configurations are just examples and not an exhaustive catalog of all possible configurations. In addition to placement of antennas on a radar sensor, there could be multiple radar sensors attached to the front, the side, or the rear of the vehicle at various heights.

Figure 16:
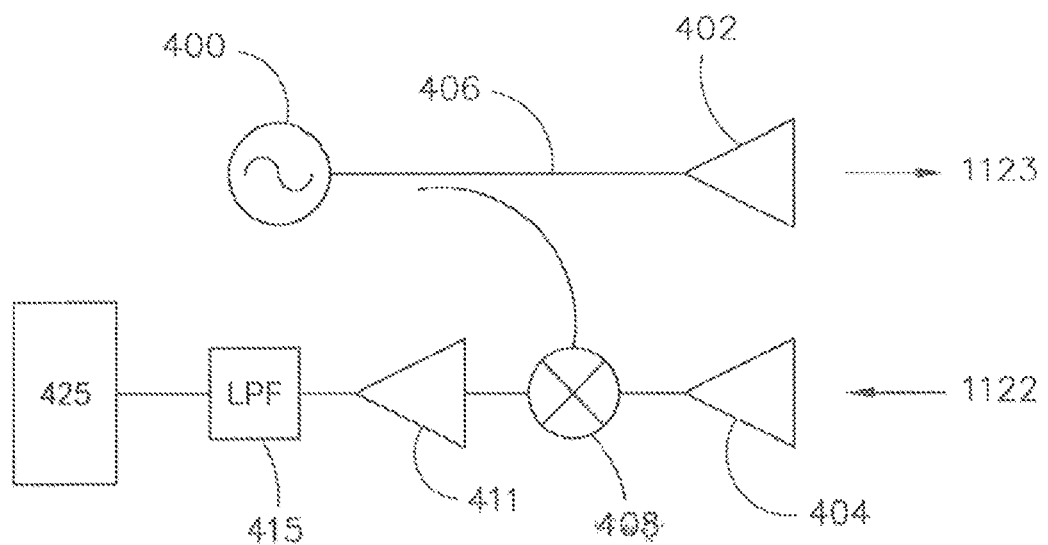
FIG. 16 is a block diagram of one type of radar sensor using Continuous Wave radar technology, according to one embodiment.

Different radars can be used to determine the position of the microwave reflector relative to the vehicle. FIG. 16 shows a similar CW radar as FIG. 11 with similar components except the processed signal from the low-pass filter 415 is sent directly into the A/D converter of the radar processor 425. The radar processor 425 can be, for example, a microcontroller, a data processing unit, a computer, a smart device, or digital processor. The signal 1120 is generated by a oscillator 400 and sent out of the transmitting antenna 402. The returned signal 1122 is received by a receiving antenna 404 and converted via a mixer 408 with the transmitted signal via a path 406. The converted signal outputs a baseband signal, which is the DC amplitude of the returned signal 1122. The baseband signal is amplified by an amplifier 411 and filtered by a low-pass filter 415 and sent to the A/D converter of the radar processor 425.

Figure 17:
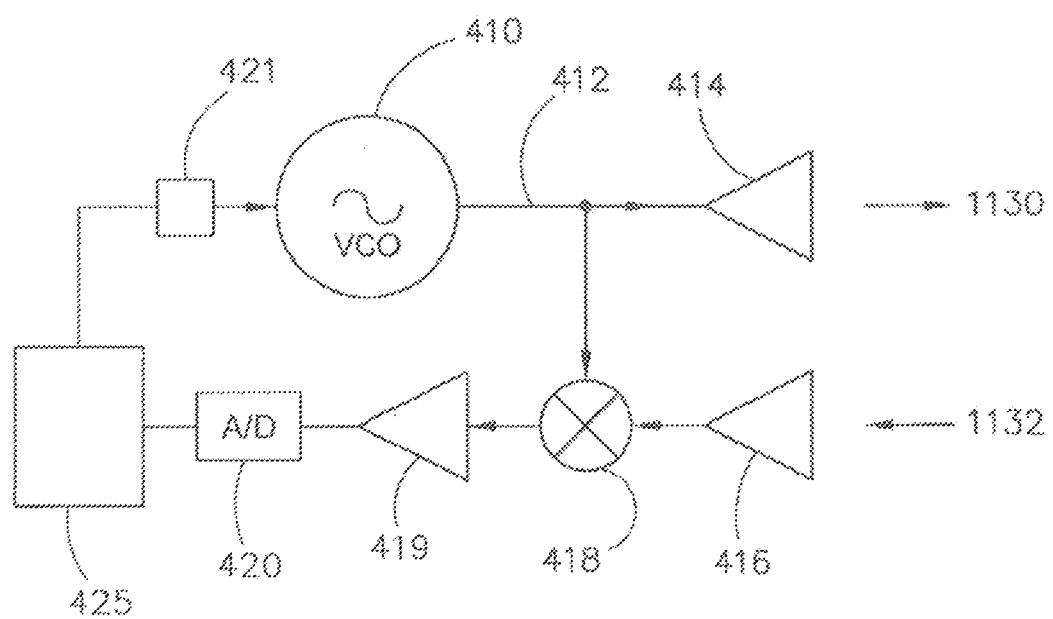
FIG. 17 is a block diagram of another type of radar sensor using Frequency Modulated Continuous Wave radar technology, according to one embodiment.

FIG. 17 shows a FWCW (Frequency-Wave Continuous Wave) radar. In this embodiment, the processor 425 generates a DC (direct current) signal via a DAC (digital-to-analog converter) 421 to control a VCO (voltage controlled oscillator) 410. The VCO 410 generates a signal 1130 and sends the signal 1130 through the antenna 414. The signal 1132 is received via an antenna 416 and combined by a mixer 418 with the transmitting signal via path 412. The output of the mixer 418 is amplified and filtered via unit 419 and sent to the A/D (analog-to-digital) converter 420. The processor 425 receives the signal from the A/D convertor 420 and processes the signal for distance and amplitude information. An advantage of using a FMCW radar over CW radar is that both the distance and signal amplitude can be determined.

Figure 18:
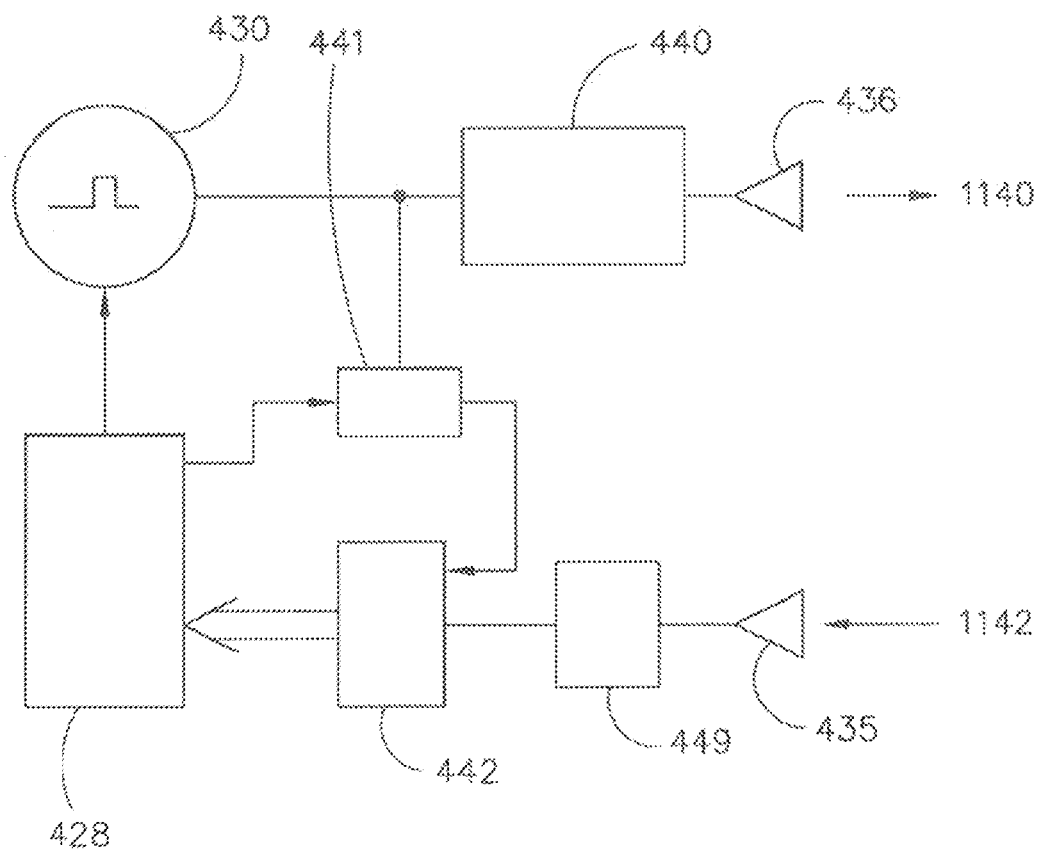
FIG. 18 is a block diagram of another type of radar sensor using Ultra-Wide Band radar technology, according to one embodiment.

FIG. 18 shows an embodiment of an UWB impulse radar unit. In this embodiment, the UWB impulse radar unit generates short pulses via a pulse generator 440 and transmits the short pulses through an antenna 436, and then the signal propagates to the ground surface and microwave reflector (not shown). When the signal meets the ground surface and microwave reflector, some of the signal is reflected from the ground surface, but significantly more of the signal is reflected from the microwave reflector and propagates back to the antenna 435. The returned ground surface signals can be filtered out by several methods. One method is to select only signals above a certain amplitude threshold. Another method is to receive signals without the reflector and then use that base signal to filter out the ground surface. There are many other schemes to filter out all or some of the ground surface signals. The signals 1142 from the ground surface and microwave reflector are amplified by an amplifier 449 and sent to a sampler/data acquisition unit 442. The sampler/data acquisition unit 442 samples the received signal 1142 at various times from the initial transmit signal 1140 generated by a timer 430 via the pulse generator 440. The timer 430 initiates the pulse via pulse generator 440, but the timer 430 is also used for timing signal to sample the incoming delays. The incoming signal 1142 is sampled in time at different delays and the amplitude of the incoming signal 1142 is recorded at those different times. At a certain time, the returned signal will be of a certain amplitude representing the returned signal from the microwave reflector. A computer 428 processes the information from the sampler/data acquisition unit 442 to determine, at least approximately, the distance from the radar unit to the microwave reflector. The time delay between the transmitted signal 1140 and the received signal 1142 represents the distance between the radar unit and the microwave reflector. The impulse radar uses pulses with short duration and wide frequency band to provide high-resolution distance measurements. Advantages of this embodiment include high accuracy and low power.

Figure 19:
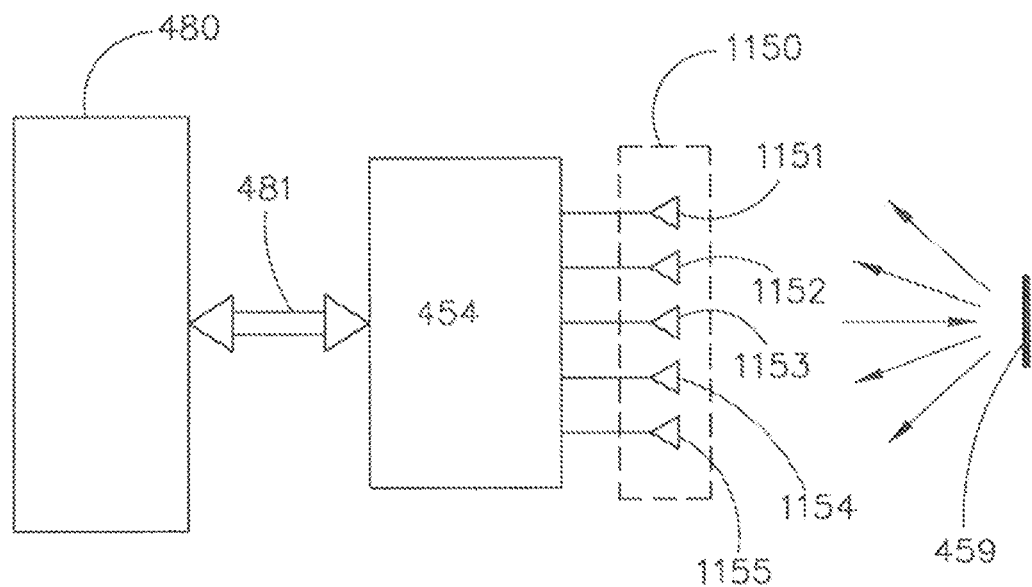
FIG. 19 is a block diagram of a multiple-input, multiple-output impulse radar system, according to one embodiment.

FIG. 19 shows an impulse radar unit 454 as described above with multiple transmitter and received antennas 1151-1155. As shown in FIG. 19, this embodiment, is a multiple-input, multiple-output radar system comprising an antenna array 1150, an impulse radar subsystem 454, and a computer 480. The antenna array 1150 is composed of multiple antennas 1151-1155, typically between two to several hundred antennas. The antennas can be of any type known in the art such as, for example, printed antennas, waveguide antennas, dipole antennas, or Vivaldi broadband antennas. The antenna array 1150 can be linear or two-dimensional, flat or conformal to the region of interest.

Figure 20:
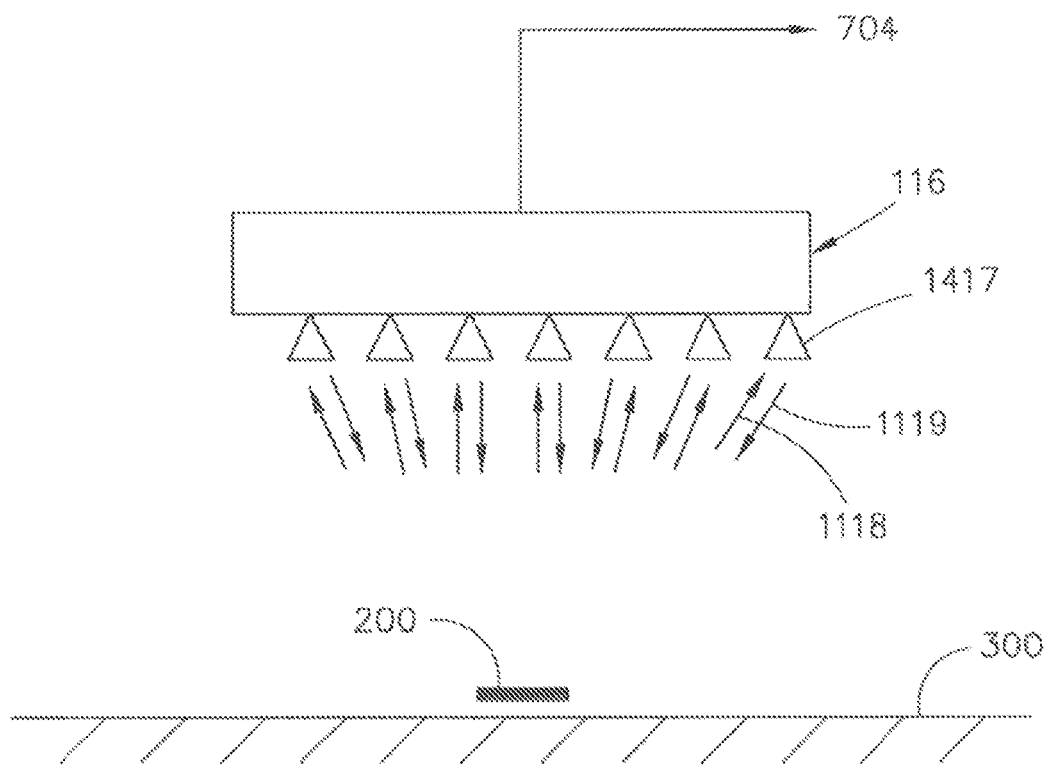
FIG. 20 is a front pictorial view of the radar sensor in FIG. 19 tracking the microwave reflector.
Figure 21:
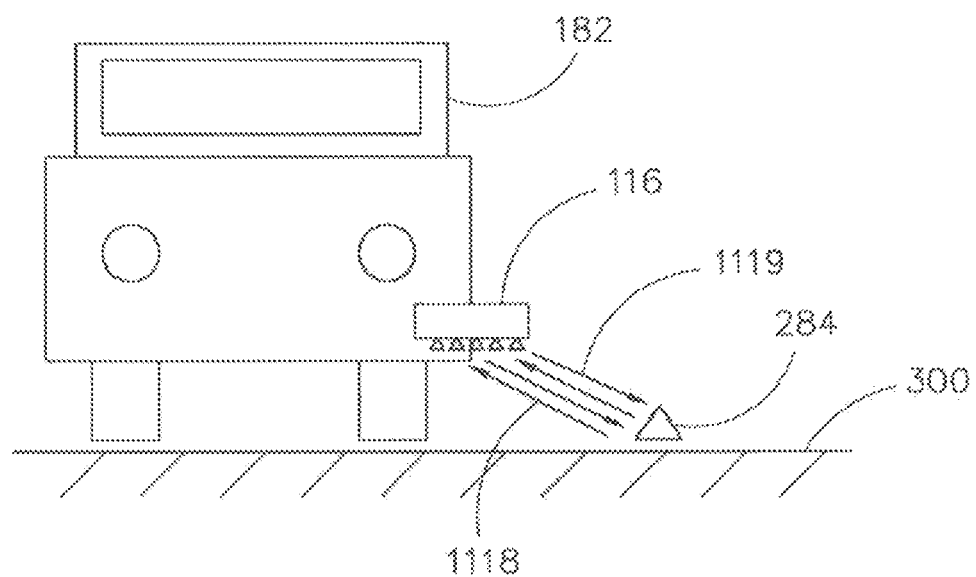
FIG. 21 is a front pictorial view of a radar sensor on a vehicle tracking a side microwave reflector, according to one embodiment.

The impulse radar unit 454 generates microwave signals and transmits the microwave signals via the antenna array 1150. The impulse radar unit 454 receives the returned signals from the antenna array 1150. The signals can be, for example, pulse signals, stepped-frequency signals, or the like. The generation circuitry within the impulse radar 454 can involve oscillators, synthesizers, mixers, or it can be based on pulse-oriented circuits such as logic gates or step-recovery diodes. The conversion of the signals can include down conversions, sampling,/or the other similar techniques. The impulse radar can perform transmission and reception with multiple antennas at a time or select one transmit and one receive antenna at a time. The impulse radar unit preferably has data acquisition capability to collect and digitize the signals from the antenna array 1150. The data acquisitions capability will typically include analog-to-digital converters, data buffers, and filtering functions. The computer 480 may convert the collected signals into responses characterizing the microwave reflector 459 and performs algorithms for converting the sets of responses into image data (two- or three-dimensional) of the microwave reflector. The microwave reflector image can be determined in respect to the antenna array 1150 alignment; therefore, the orientation of the microwave reflector 459 can be determined with respect to the antenna array 1150. FIG. 20 shows another embodiment of a radar sensor 116, which is typically an impulse radar sensor, with a multiple antenna array 1417 having two or more antennas positioned towards the microwave reflector 200 and the ground surface 300. The radar sensor 116 sends out signals 1119 from the antenna array 1417 via one or more the array's constituent antennas. Received signals 1118 can be processed for distance, amplitude, and angle to the microwave reflector 200. With this embodiment, each antenna provides information to the radar sensor 116 to continuously track the microwave reflector 200 with all the antennas. The radar antenna array 1417 can track side reflectors, as shown by way of example in FIG. 21. In this embodiment, the radar sensor 116 includes an antenna array mounted on the front side of the vehicle 182 and tracking the side microwave reflector 284. The microwave reflector 284 can be installed along the side of the roadway or the center of the roadway, and the reflector can be a continuous reflector or intermittent sections of reflective material.

Figure 22A:
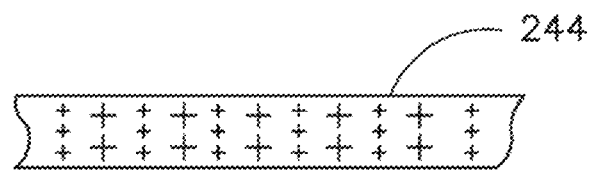
FIG. 22A is a top pictorial view of a microwave reflector with frequency-selective properties, according to one embodiment.
Figure 22B:
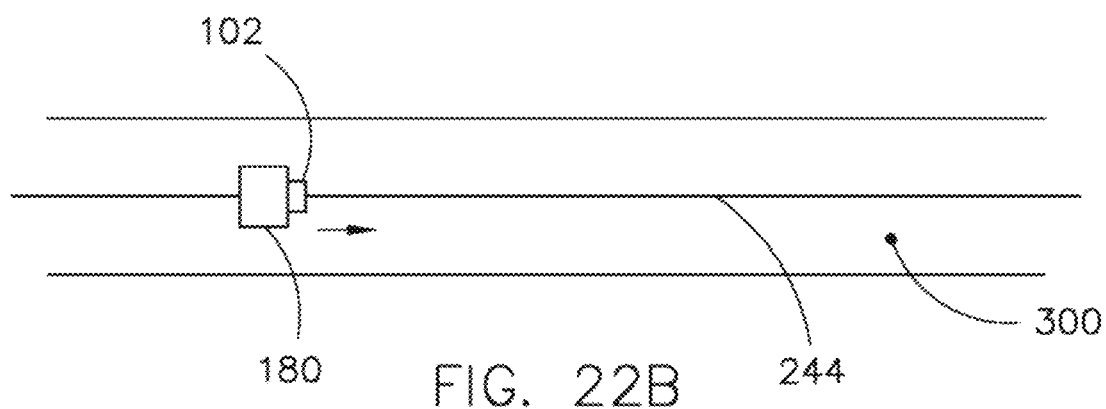
FIG. 22B is a top pictorial view of a vehicle with a radar sensor following the microwave reflector in FIG. 22A installed on a straight section of a roadway.
Figure 22C:
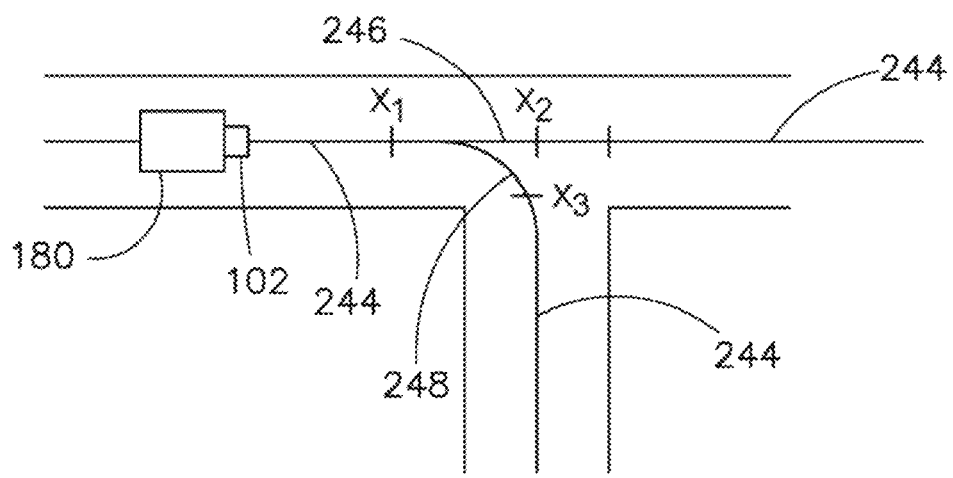
FIG. 22C is a top pictorial view of a vehicle with a radar sensor following the microwave reflector in FIG. 22A installed at an intersection of roadways.

FIGS. 22A-22C illustrate a dual-band microwave reflector scheme. FIG. 22A illustrates a dual-band microwave reflector 244 as a painted strip, taped strip, or installed strip with small and large dipole crosses for reflecting two different microwave frequencies or frequency bands. The vehicle 180 uses a dual-band radar 102 or two separate radar sensors to follow the microwave reflector 244 on the straight roadway surface 300 shown in FIG. 22B. On the straight section of the roadway 300, the dual-band microwave reflector scheme allows for redundancy on the microwave reflector 244. If, for any reason, one frequency or one band of frequencies is interfered with or not operating satisfactorily, the other frequency or band of frequencies would allow for continual operation. When in the intersection, as shown in FIG. 22C, the dual-band microwave reflector 244 splits into separate bands as microwave reflectors 246 and 248 at a location $X_1$. The microwave reflector 246 continues for some distance on the straight section of the roadway and then reverts back to the dual-band reflector 244 at location $X_2$. The microwave reflector 248 veers off to the right and then reverts back to the dual-band reflector 244 at distance $X_3$. An onboard vehicle controller, not shown, would either track the microwave reflector 246 to go straight through the intersection or would track the microwave reflector 248 to make a right turn.

Figure 23A:
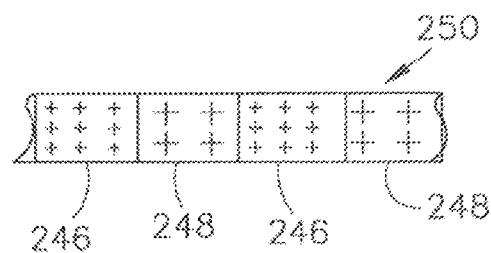
FIG. 23A is a top pictorial view of two microwave reflectors with different frequency-selective properties, according to one embodiment.
Figure 23B:
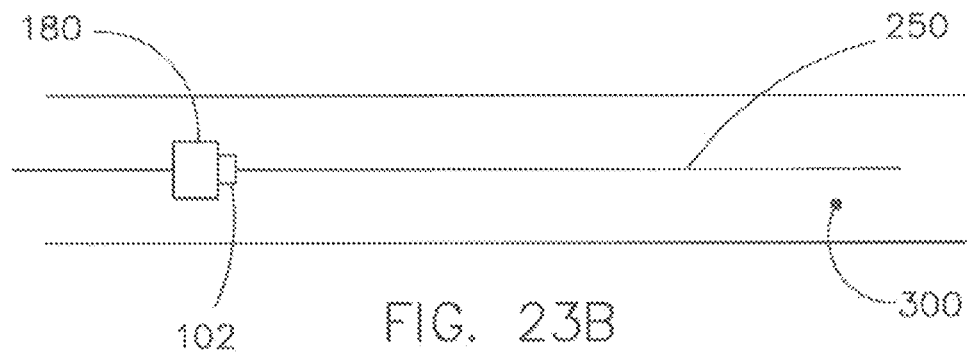
FIG. 23B is a top pictorial view of a vehicle with a radar sensor following the microwave reflector in FIG. 23A installed on a straight section of a roadway.
Figure 23C:
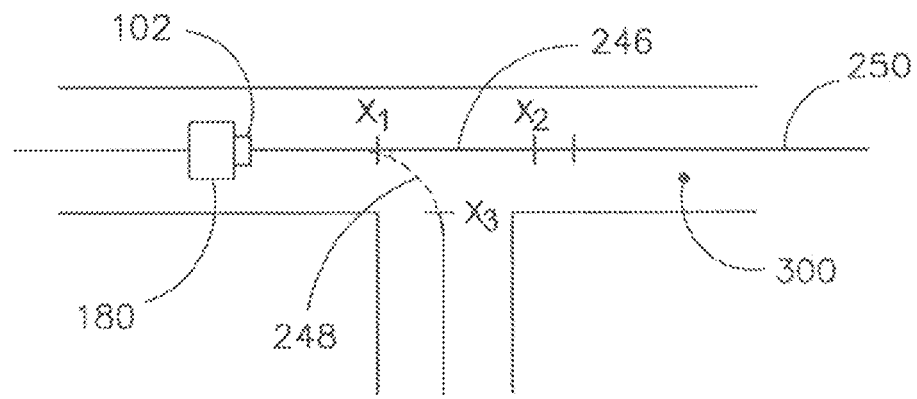
FIG. 23C is a top pictorial view of a vehicle with a radar sensor following the microwave reflector in FIG. 23A installed at an intersection of roadways.

FIGS. 23A-23C illustrate another dual-band microwave reflector scheme. FIG. 23A illustrates a dual-band microwave reflector 250 as painted strip, taped strip, or installed strip with alternating sections of small dipole crosses 246 and sections of large dipole crosses 248 for reflecting two different microwave frequencies or two different bands of microwave frequencies. The vehicle 180 uses a dual-band radar sensor 102 or two or more separate radar sensors to follow the microwave reflector 250 on the straight roadway surface 300, as shown in FIG. 23B. On the straight section of the roadway 300, the dual-band microwave reflector scheme allows for redundancy on the microwave reflector 250. If, for any reason, one frequency or band of frequencies is interfered with or not operating well, the other frequency or band of frequencies can allow continued operation. When in the intersection, as shown in FIG. 23C, the dual-band microwave reflector 250 splits into separate bands and microwave reflectors 246 and 248 at a location $X_1$. The microwave reflector 246 continues for distance on the straight section of the roadway and then reverts back to the dual-band reflector 250 at location $X_2$. The microwave reflector 248 veers off to the right and then reverts back to the dual-band reflector 250 at location $X_3$. The onboard vehicle controller, not shown, would either track the microwave reflector 246 to go straight through the intersection or would track the microwave reflector 248 to make a right turn. FIG. 23A shows different microwave reflectors 246 and 248 spaced closed to each other, but these reflectors could be spaced with gaps of road surface between the reflectors. Besides frequency differences between the two microwave reflectors, the microwave reflectors could have similar or different frequency properties, but the physical size and shape of the different microwave reflectors could be used to distinguish different pathways. For example, the microwave reflector 246 could have a narrow shape, and the microwave reflector 248 could have a wide shape, such that the radar imaging process could distinguish the two different physical microwave reflectors.

Figure 24:
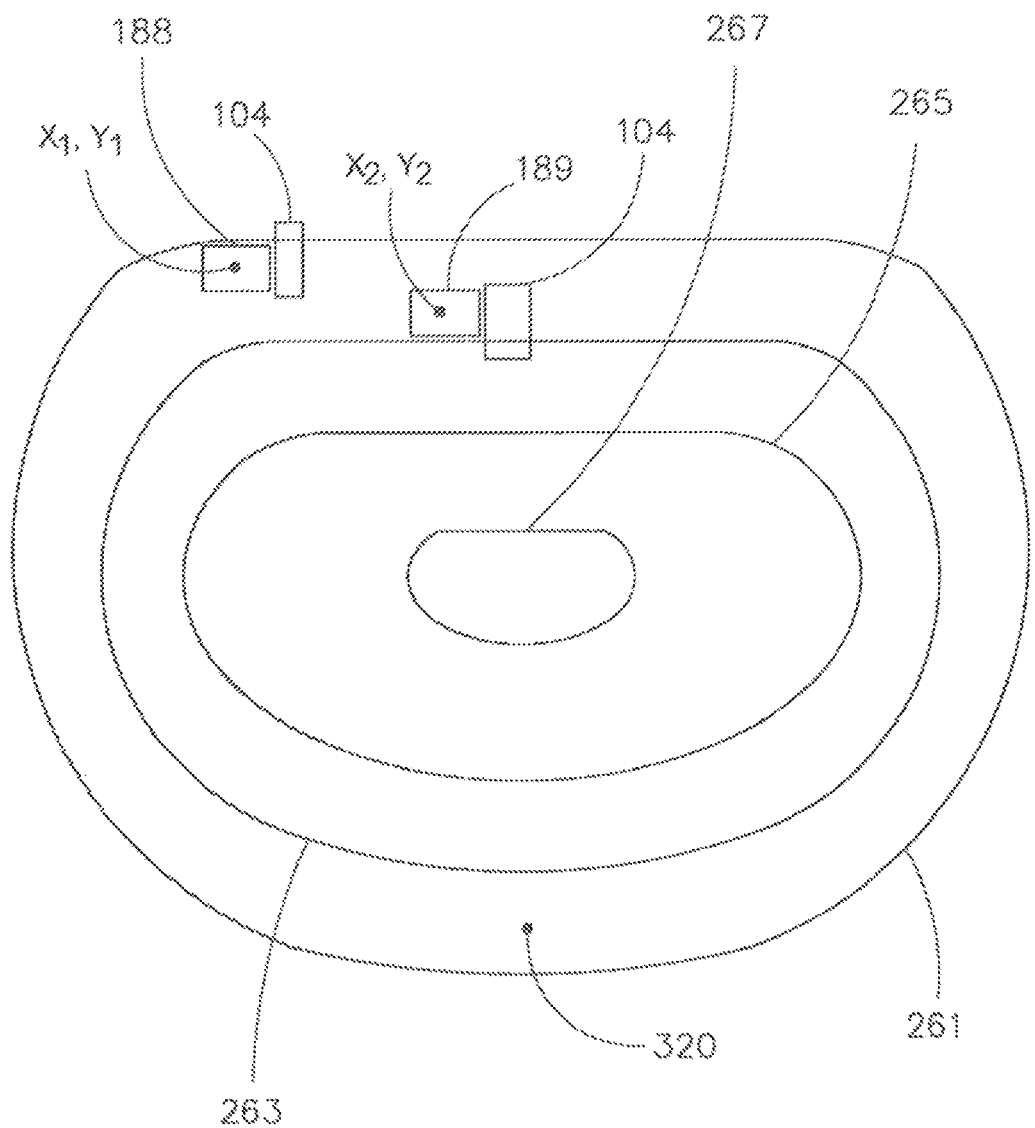
FIG. 24 is a top pictorial view of a lawnmower with a radar sensor following microwave reflectors buried in a lawn, according to one embodiment.

FIG. 24 shows another embodiment of the radar sensor scheme. Here, the vehicle is a robotic lawnmower 188 with a radar sensor 104 mowing a field 320 by following embedded microwave reflectors 261, 263, 265, and 267. The microwave reflectors 261, 263, 265, and 267 can be installed in the soil just below the vegetation, e.g., grass. Also, one could use pre-installed irrigation pipes or install irrigation pipes in a certain configuration as the microwave reflectors for the radar sensor to track. FIG. 24 shows two vehicles 188 and 189, but they can be the same vehicle at different locations on the field 320. In this embodiment, the radar sensor 104 installed on the vehicles is longer than the width of the vehicle. The first vehicle 188, located at coordinates $x_1$, $y_1$, tracks the microwave reflector 261 with the left side of the radar sensor 104, and the second vehicle 189 located at coordinates $x_2$, $y_2$, tracks the microwave reflector 263 using the right side of the radar sensor 104. The vehicles 188 and 189 can move towards the right after each travelling around the field by the onboard vehicle controller, not shown, and pick up the next (more inwardly, as shown) microwave reflector. There are other configurations for installation of the microwave reflectors such as installation of a microwave reflector installed at a section of the field to join adjacent microwave reflectors.

Figure 25A:
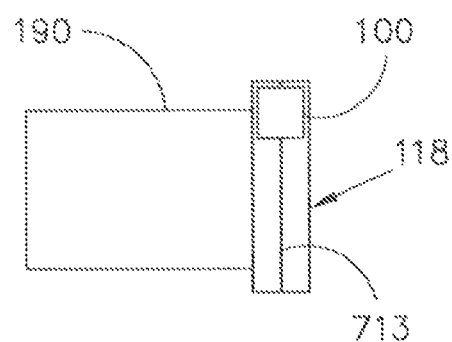
FIG. 25A is a top pictorial view of a radar sensor with mechanical movement capabilities mounted on a front of a vehicle, according to one embodiment.
Figure 25B:
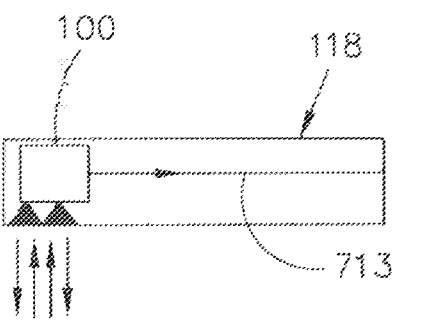
FIG. 25B is a front pictorial view of the radar sensor in FIG. 25A.

Another configuration shown in FIGS. 25A and 25B allows the radar sensor 100 on one side of the vehicle to move to the other side by a mechanical movement mechanism. FIG. 25A shows a top view of a vehicle 190 with a mechanical mechanism 713 that moves the radar sensor 100 along an entire sensor guide 118. FIG. 25B shows a front view of the just the radar sensor 100 and the guide 118. This embodiment employs a mechanical means to move the smaller radar, but the radar sensor can be designed to electronically move the beam using a multiple-antenna radar array or have a significant number of antennas spaced across the entire sensor guide 118.

Figure 26A:
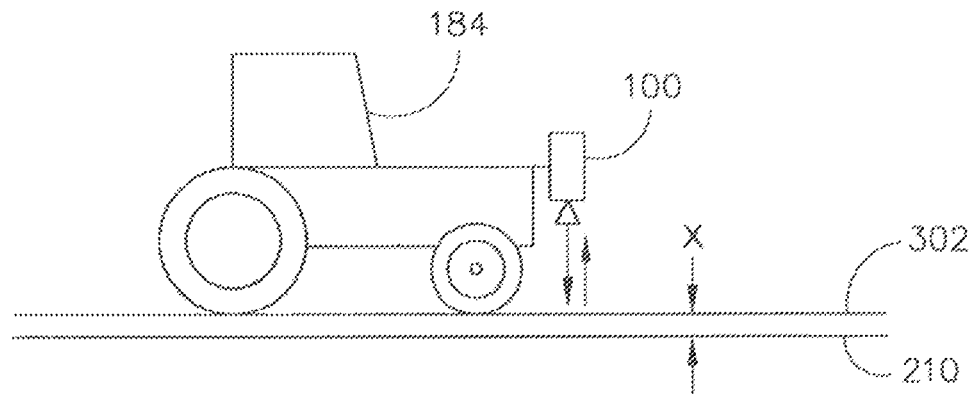
FIG. 26A is a side pictorial view of a tractor with a radar sensor following a microwave reflector buried under the ground surface, according to one embodiment.
Figure 26B:
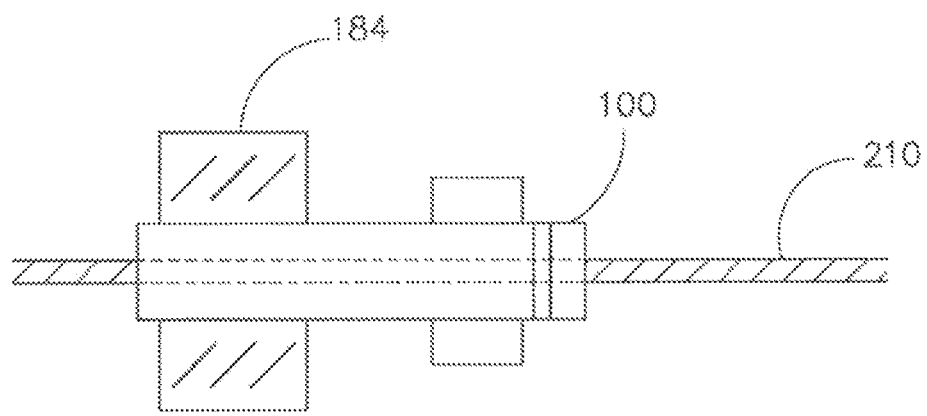
FIG. 26B is a top pictorial view of the tractor in FIG. 26A.

FIG. 26A and 26B show side and top views of an agricultural tractor 184 with the radar sensor 100 mounted on the front of the tractor 184. The radar sensor antennas are pointed downward towards the ground surface 302. A microwave reflector 210 is installed slightly below the surface at a distance/depth x. The radar sensor 100 receives returned signals reflected from the ground surface and from the embedded microwave reflector 210. An onboard computer, not shown, could steer the tractor 184 along the embedded microwave reflector 210 or prompt a driver (not shown) to adjust the tractor's steering to better align its trajectory to the reflector 210.

Figure 27:
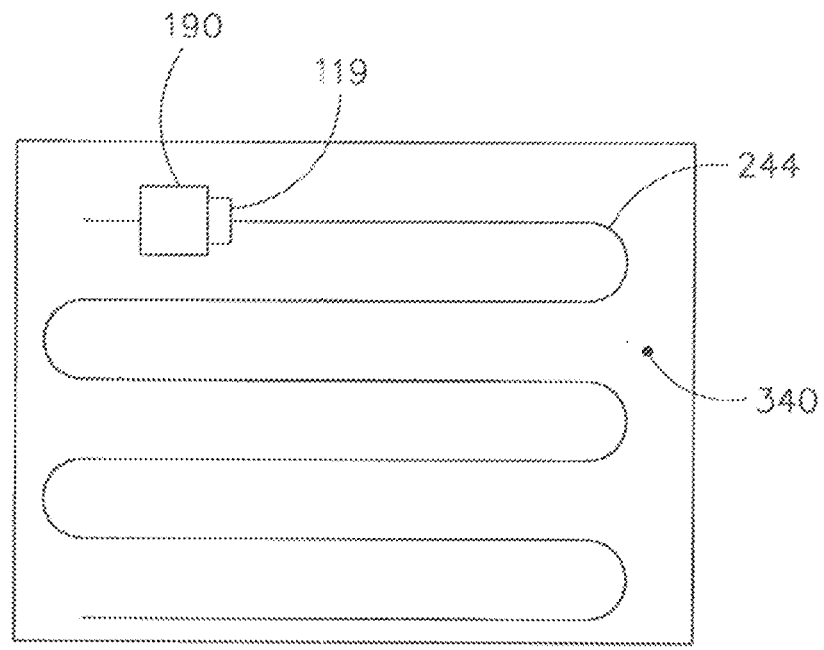
FIG. 27 is a top pictorial view of an indoor mobile appliance with a radar sensor tracking a microwave reflector installed in a room, according to one embodiment.

Another application of the radar sensor scheme is shown in FIG. 27. In this embodiment, a radar sensor 119 is mounted on the front of an indoor mobile appliance 190, e.g., a vacuum cleaner, floor scrubber, ice resurfacing machine (e.g., Zamboni® brand machine). The microwave reflector 244 may be installed under the carpet or floor board in a room 340. The mobile appliance 190 tracks the microwave reflector 244 and its onboard computer/steering mechanism (not shown) could steer the mobile appliance around the room following the microwave reflector 224 (or assist an operator who performs manual steering). The microwave reflector 244 can be installed in a rectanglular or other suitable pattern with different microwave reflective surfaces to provide guidance information to the onboard computer via the radar sensor 119.

Figure 28:
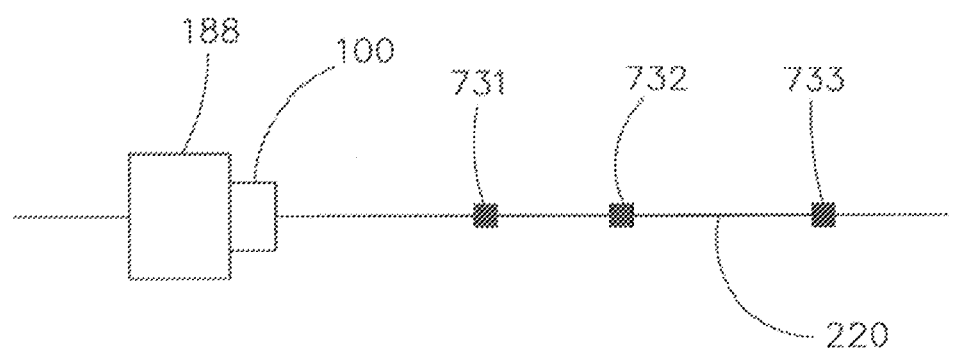
FIG. 28 is a top pictorial view of a vehicle with a radar sensor following a microwave reflector and discrete location microwave reflectors, according to one embodiment.

As shown in FIG. 28, the radar sensor 100 can track location markers 731, 732, and 733 made from different reflective surfaces, besides the microwave reflector 220 for lateral control. In this embodiment, the vehicle 188 using the radar sensor 100 follows the microwave reflector 220 and also indicates when the vehicle is over the location markers 731, 732, and 733.

Figure 29:
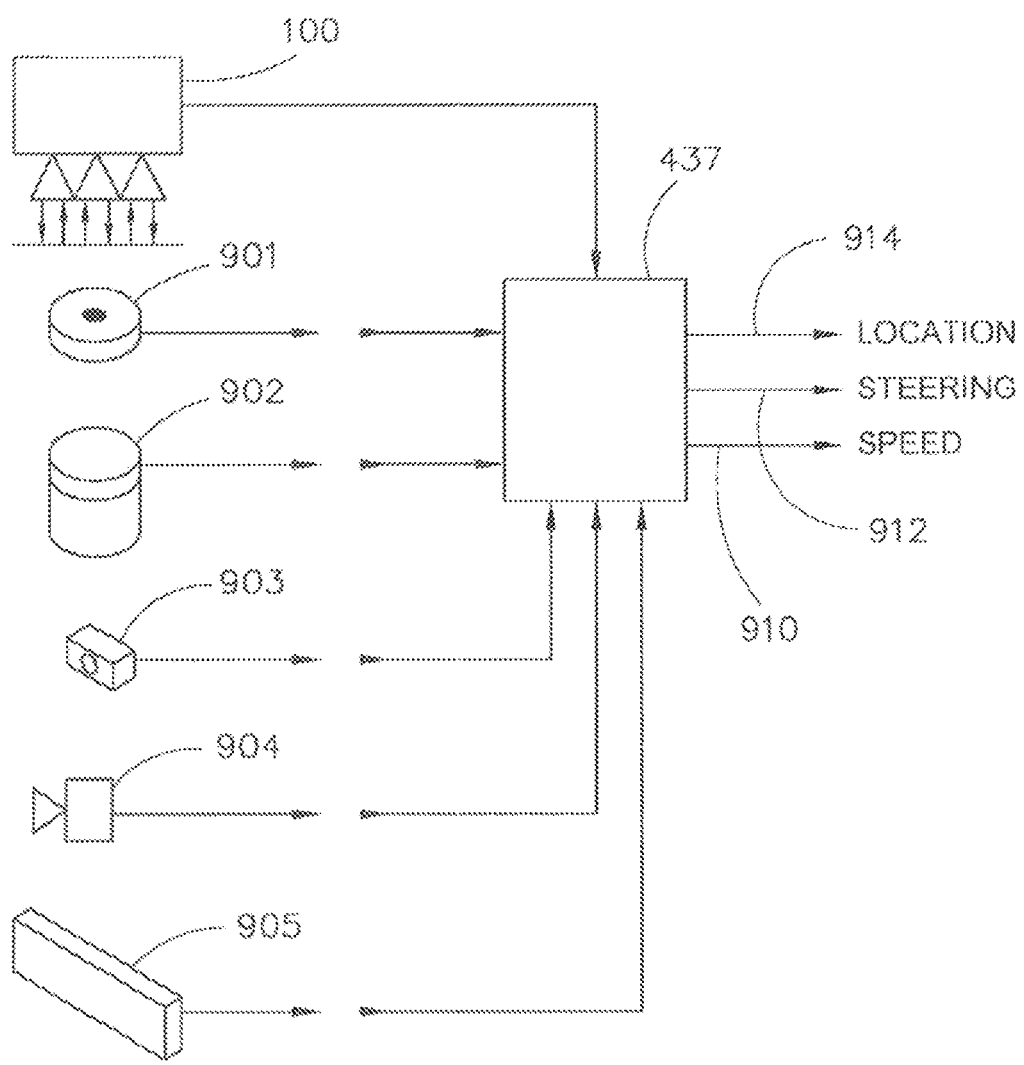
FIG. 29 is a block diagram of a radar sensor integrated with other location sensors, according to one embodiment.

For redundancy and higher reliability, the radar sensor 100 can be integrated with other sensors such as a GPS receiver 901, Lidar sensor 902, vision sensor 903, forward-looking radar 904, or other location sensors 905, as shown in FIG. 29. The output of a onboard processor 437 may include highly reliable location information 914, steering information 912, and speed information 910.

Conclusion

The terms and descriptions used above are set forth by way of illustration and example only and are not meant as limitations. Those skilled in the art will recognize that many variations, enhancements and modifications of the concepts described herein are possible without departing from the underlying principles of the invention. The scope of the invention should therefore be determined only by the following claims and claims presented in any continuing patent or patent application, with full recognition of the scope of all equivalents to every element in such claims.

The invention claimed is:

1. An apparatus for determining a lateral position of a land vehicle on a pathway on which one or more microwave reflectors are distributed on a surface of the pathway in a direction of travel of the vehicle, the one or more microwave reflectors having reflectivity different from the surface of the pathway where no microwave reflectors are present, the apparatus comprising:
a radar sensor mounted to the vehicle and configured to transmit a radar signal having a beam pattern center aimed downward from the vehicle toward the surface of the pathway and sideways from the vehicle generally perpendicular to the direction of travel of the vehicle, the radar sensor being further configured to detect one or more reflections of the radar signal from the pathway; and
a processor operatively connected to the radar sensor and configured to determine a lateral distance of the vehicle from at least one of the microwave reflectors on the surface of the pathway.

2. An apparatus according to claim 1, wherein the radar sensor comprises a FMCW (Frequency Modulated Continuous Wave) radar sensor.

3. An apparatus according to claim 1, wherein the radar sensor comprises an ultra-wideband (UWB) radar sensor.

4. An apparatus according to claim 1, wherein the radar sensor comprises a monopulse radar sensor.

5. An apparatus according to claim 1, wherein the radar sensor comprises a multi-frequency radar sensor.

6. An apparatus according to claim 1, wherein the radar sensor comprises a UWB (Ultra-Wide Band) radar sensor.

7. An apparatus according to claim 1, wherein the radar sensor comprises a UWB (Ultra-Wide Band) impulse radar sensor.

8. An apparatus according to claim 1, wherein the radar sensor comprises a plurality of antennas.

9. An apparatus according to claim 1, wherein the one or more microwave reflectors comprises a metallic paint, a metallic tape, metallic strip, a metallic mesh, a corner reflector, a frequency-selective surface, a round wire, a flat conductor, or a pipe.

10. An apparatus according to claim 9, wherein the frequency-selective surface comprises dipoles, loops, combination of dipoles and loops, cross dipoles, rectangular loops, Y junctions, or crosses.

11. An apparatus according to claim 1, wherein the pathway is one of a road, street, highway, lawn, field, open terrain, room in a building, manufacturing floor, parking lot, warehouse, or depot.

12. A method for guiding or assisting guiding a vehicle along a pathway, the method comprising:
directing radar waves from the vehicle downward and to a side of the vehicle, wherein one or more microwave reflectors are placed along the pathway;
receiving reflections of the radar waves from the pathway; and
processing the reflections of the radar waves to determine distances between the vehicle and at least some of the one or more microwave reflectors.

13. The method according to claim 12, further comprising:
controlling, based on the distances, steering of the vehicle so as to follow alongside the one or microwave reflectors.

14. An apparatus for guiding a land vehicle along a pathway on which one or more microwave reflectors with different reflective signals than the pathway are distributed along the pathway in a direction of vehicle travel, the apparatus comprising:
a means for radiating downward and sideways from the vehicle one or more radar transmit signals having beam centers aimed partially downward toward at least some of the one or more microwave reflectors and for receiving one or more received signals as reflections of the transmit signals; and
a means for processing the one or more received signals to determine a position of the vehicle relative to at least one of the one or more microwave reflectors.

15. An apparatus according to claim 14, wherein the one or more microwave reflectors comprise a metallic paint, a metallic tape, a metallic strip, a metallic mesh, a corner reflector, a frequency selective surface, a round wire, or a pipe.

16. An apparatus according to claim 14, wherein the pathway is one of a road, street, highway, lawn, field, open terrain, room in a building, manufacturing floor, parking lot, warehouse, or depot.

17. An apparatus according to claim 14, wherein the means for radiating and for receiving comprises a plurality of antennas.

18. An apparatus according to claim 14, wherein the radar transmit signals comprise FMCW (Frequency Modulated Continuous Wave) radar signals.

19. An apparatus according to claim 14, wherein the radar transmit signals comprise multi-frequency radar signals.

20. An apparatus according to claim 14, wherein the radar transmit signals comprise UWB (Ultra-Wide Band) radar signals.

* * * * *